(12) United States Patent
Bindloss, Jr. et al.

(10) Patent No.: US 6,601,519 B1
(45) Date of Patent: Aug. 5, 2003

(54) HYBRID MAGNETICALLY SUPPORTED CARRIAGE TRANSPORTER

(75) Inventors: William Bindloss, Jr., Wilmington, DE (US); Andris Suna, Wilmington, DE (US); Albert White Forrest, Jr., Chillicothe, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/980,720

(22) PCT Filed: May 19, 2000

(86) PCT No.: PCT/US00/14011
§ 371 (c)(1),
(2), (4) Date: Nov. 15, 2001

(87) PCT Pub. No.: WO00/71381
PCT Pub. Date: Nov. 30, 2000

Related U.S. Application Data
(60) Provisional application No. 60/135,242, filed on May 21, 1999.

(51) Int. Cl.[7] ................................................ B60L 13/06
(52) U.S. Cl. ...................................................... 104/284
(58) Field of Search ................................. 104/281, 282, 104/283, 284

(56) References Cited

U.S. PATENT DOCUMENTS

| | | | |
|---|---|---|---|
| 3,865,043 A | | 2/1975 | Schwarzler |
| 4,280,412 A | * | 7/1981 | Mihirogi ..................... 104/281 |
| 4,969,401 A | | 11/1990 | Kolm |
| 5,319,275 A | * | 6/1994 | Tozoni ....................... 310/90.5 |
| 5,388,527 A | | 2/1995 | Thornton |
| 5,440,997 A | | 8/1995 | Crowley |
| 5,809,897 A | | 9/1998 | Powell et al. |
| 5,868,077 A | | 2/1999 | Kuznetsov |

* cited by examiner

Primary Examiner—S. Joseph Morano
Assistant Examiner—Robert J. McCarry, Jr.
(74) Attorney, Agent, or Firm—Thomas H. Magee

(57) ABSTRACT

A carriage transporting apparatus is capable of transporting one or more carriages along a track, substantially free of mechanical friction or magnetic drag, by magnetically supporting the carriages in a first direction and by stabilizing the position of the carriages in a second direction by passive means.

35 Claims, 27 Drawing Sheets

HYBRID MAGNETICALLY SUPPORTED CARRIAGE TRANSPORTER

This application claims the benefit of Provisional application Ser. No. 60/135,242 filed May 21, 1999.

BACKGROUND OF THE INVENTION

1. Field of the Invention

The present invention pertains to an apparatus for transporting a carriage along a track, substantially free of mechanical friction or magnetic drag, utilizing a hybrid support arrangement. The carriage is magnetically supported in a first direction, and the position of the carriage is stabilized in a second direction by passive means.

2. Description of Related Art

Transporting carriages along a track, substantially free of mechanical friction, has long been a goal. Numerous systems to transport passengers and cargo at high speeds or to convey manufactured articles or machine components in manufacturing systems have been devised. Prior art systems may be grouped as either "contacting systems", i.e., wherein the carriage is in mechanical contact with the track, or "non-contacting systems", i.e., wherein there is no mechanical contact between the carriage and the track. Each group of systems typically suffers from certain disadvantages.

Contacting Systems—Conventional mechanical track systems which require mechanical contact between the carriage and the track typically employ either slide mechanisms or wheels to transport the carriage. Such systems suffer from significant mechanical friction. Slide mechanisms, which require the use of either hydrostatic or hydrodynamic lubrication, almost always leak and contaminate the equipment. Wheeled systems employ low-friction ball or roller bearings, which also typically require lubricants. Although bearings in wheeled systems may incorporate seals to contain the lubricant, the rolling contact of the wheel with the track usually generates wear particles which ultimately contaminates the equipment.

Non-contacting Systems—Conventional non-contacting transport systems include either aerostatically supported arrangements, commonly referred to by the terms "air-bearing systems" or "gas-bearings", or magnetically supported arrangements, commonly referred to by the terms "magnetic bearings" or "magnetic levitation systems".

Aerostatic arrangements—Aerostatic or air-bearings use a thin film of a high-pressure gas, typically air, to support a load. Since gases have very low viscosity, the gaps between elements in such bearings must be small, typically less that about 10 micrometers. In typical linear aerostatic systems, the gas is provided to the moving element or carriage. This restricts the range of motion of the carriage due to the need to supply the high-pressure gas to the carriage from a typically stationary gas source. In such linear aerostatic arrangements, one element is a pad, through which the high-pressure gas is supplied, and the other element is a slide or slideway, on which the pad is supported by the film of gas. The pad may be perforated, slotted, or made of a porous material to distribute the gas over the face of the pad. In such arrangements, the extremely small clearances require that the surface of the pad closely conform to the slideway. This is typically accomplished by making the both the pad and the slideway extremely flat. Even when the pad is articulated to permit it to follow the surface of the slideway, only very gradual curves of very large radius can be accommodated.

Magnetically Supported Arrangements—Numerous magnetic levitation arrangements using permanent magnets and electromagnets, or combinations of the two, are known. British Patent 867,045 and British Patent 1,035,764 are typical examples of such prior art arrangements.

In electromagnetic field theory, it has long been known that magnetic levitation arrangements, using only permanent magnets, cannot be simultaneously stable in three orthogonal directions. Earnshaw first published his findings in 1849 and his work is popularly known as "Earnshaw's Theorem". The term "magnetic stability" is usually defined in mathematical terms using the convention of a Cartesian coordinate system, i.e., orthogonal x, y, and z coordinates. For a system having a magnetic restoring force F and a displacement along the y-axis, "magnetic stability" means that the derivative of the magnetic restoring force F with respect to the displacement direction shall be negative, i.e., for a displacement along the y-axis, $dF_y/dy<0$. Since Earnshaw's Theorem requires that the sum of the force derivatives be equal to zero, i.e., $dF_x/d_x+dF_y/dy+dF_z/dz=0$, it can be seen that all three derivatives can not simultaneously be negative.

Active stabilization systems employing position sensing and feedback control have been employed to overcome the limitations imposed by Earnshaw's Theorem. A prior art system, such as that described in U.S. Pat. No. 4,142,469, is typical of an actively stabilized magnetic levitation arrangement. This patent discloses a tracked vehicle system employing a combination of permanent magnets and one or more electromagnets, the electromagnets being energized by the feedback control system. The electromagnets are employed to control the magnet flux, which controls the lifting force, and they are used to maintain lateral position control for tracking the vehicle along the desired path.

FIG. 1 shows a system 2 from which the principles underlying an actively stabilized magnetic levitation arrangement may be appreciated. Permanent magnets 3 for a carriage 4 and permanent magnets 5 for a track base 6 levitate the carriage 4 in a first direction. The position of the carriage 4 is stabilized in a second direction by the use of carriage position or gap sensors 7 and an active carriage position feedback mechanism to energize one or more electromagnets 8. An active stabilization system, as shown in FIG. 1, results in increased complexity and cost of the levitation system.

Prior art magnetically levitated transport systems typically suffer from a significant amount of magnetic drag. Magnetic drag, while somewhat analogous to mechanical friction, changes in magnitude as the carriage speed changes. Additional power must therefore be supplied by the drive system to overcome the magnetic drag, as well as the aerodynamic drag which results from air resistance.

U.S. Pat. No. 5,809,897, issued on Sep. 22, 1998, discloses an electromagnetic induction ground vehicle levitation guideway for a vehicle having magnets for providing magnetic levitation of the vehicle. The vehicle is adapted to travel in a longitudinal direction along the guideway. The guideway comprises a beam support member for supporting the weight of the vehicle, and breakaway energy absorption structure mounted to the beam support member for absorbing kinetic energy from the magnetic levitation vehicle in the event of loss of magnetic levitation.

U.S. Pat. No. 5,388,527, issued on Feb. 14, 1995, discloses a multiple magnet apparatus for positioning a magnetic levitation ground vehicle that travels along a guideway at a selected position along an axis of perturbation relative to the guideway. The vehicle carries a first magnet, having its poles aligned perpendicular to the travel path of the vehicle and to the axis of perturbation, and second magnet, with its poles aligned parallel and opposite to the poles of the first magnet. The second magnet is adjacent to the first, and spaced away along the axis of perturbation. The guideway may carry conductors to interact with the vehicle magnetic fields to maintain the vehicle at the vertical position. The conductor may be a ladder, discrete coils, or a helical meander winding. The conductors may be oriented either vertically or horizontally, depending on whether the positioning device is used for suspension, or guidance.

U.S. Pat. No. 5,440,997, issued on Aug. 15, 1995, discloses a magnetic suspension transportation system for a vehicle/rail transportation system, where interacting sets of magnets are positioned on the vehicle and the rail to suspend the vehicle from the rail and permit low friction, non-contacting movement along the rail. Also, laterally facing air castors are provided for lateral support. The transportation system is stabilized in two directions by magnetic means, and uses a passive stabilization means with air pressure for stabilizing the position of the vehicle in a third direction.

The present invention overcomes the disadvantages of the prior art by utilizing a passive stabilization means to overcome the limitations imposed by Earnshaw's Theorem. As used in the context of the present invention, the term "passive stabilization means" means an arrangement for stabilizing the position of the carriage in the magnetically unstable direction without the use of carriage position sensors, without a servo-controlled electromagnet, or any feedback mechanism. The present invention provides a stable carriage suspension arrangement that has the combined advantages of imposing no mechanical friction on the carriage, and significantly reducing or even eliminating magnetic drag, with the simplicity of no active stabilization arrangement.

SUMMARY OF THE INVENTION

The present invention describes an apparatus for transporting a carriage along a track in a non-contacting, magnetically drag-free manner. The apparatus is described in reference to a set of Cartesian coordinates, i.e., orthogonal x, y, and z coordinates. The apparatus comprises a track oriented in a direction along the x-axis, a carriage guided by the track, and a motor for propelling the carriage along the track. One or more permanent magnets are mounted on the carriage, each carriage magnet having its magnetization vector oriented in the yz-plane at a predetermined angular direction relative to the z-axis. One or more permanent magnets are mounted on the track, each track magnet having its magnetization vector oriented in the yz-plane at a predetermined angular direction relative to the z-axis. The track magnets may be either arranged in a single row along the x-axis or arranged in pairs in two rows that are disposed on opposite sides of the x-axis, each row of track magnets being displaced from the x-axis in the z-axis direction. The choice of individual track magnets or pairs of track magnets depends upon the track configuration.

The track magnets interact with the one or more carriage magnets to produce either an attractive or repulsive interaction that is magnetically stable in a first direction in the yz-plane and is magnetically unstable in a second direction in the yz-plane. In a first embodiment of the invention, the direction of magnetic stability is along the y-axis and the direction of magnetic instability is along the z-axis. In a second embodiment, the direction of magnetic stability is along the z-axis and the direction of magnetic instability is along the y-axis.

In the first embodiment, the magnetic support is attractive, and a passive stabilization means is employed to stabilize the position of the carriage in the magnetically unstable z-axis direction by substantially constraining the motion of the carriage to the xy-plane, without inducing mechanical friction or magnetic drag on the carriage. This first embodiment enables the carriage to be transported in a stable path along the track without mechanical contact while supporting a load applied in the y-axis direction. When the carriage supports a y-axis direction load, the path of the carriage is displaced or offset from the x-axis in the y-axis direction at a distance corresponding to the magnitude of the applied load and the y-axis direction "magnetic stiffness" of the magnetic support. The y-axis direction stiffness of the magnetic support is a function of the relative position and orientation of the carriage and track magnets, as will be discussed. When the carriage supports a z-axis direction load, the path of the carriage is displaced or offset from the x-axis in the z-axis direction at a distance corresponding to the magnitude of the applied load and the z-axis.direction stiffness. Depending on the type of stabilization means employed, the z-axis direction stiffness is typically quite different from the y-axis direction magnetic stiffness.

In the second embodiment, the magnetic support is repulsive, and a passive stabilization means is employed to stabilize the position of the carriage in the magnetically unstable y-axis direction by substantially constraining the motion of the carriage to the xz-plane. This second embodiment enables the carriage to be transported in a stable path along the track without mechanical contact while supporting a load applied in the z-axis direction. When the carriage supports a z-axis direction load, the path of the carriage is offset from the x-axis in the z-axis direction at a distance corresponding to the magnitude of the applied load and the z-axis direction "magnetic stiffness" of the magnetic support. The z-axis direction stiffness of the magnetic support is a function of the relative position and orientation of the carriage and track magnets, as will be discussed. In a manner similar to the first embodiment, the y-axis direction stiffness depends on the type of stabilization means employed, and is typically quite different from the z-axis direction magnetic stiffness.

DETAILED DESCRIPTION OF THE PREFERRED EMBODIMENT(S)

Figure 1:
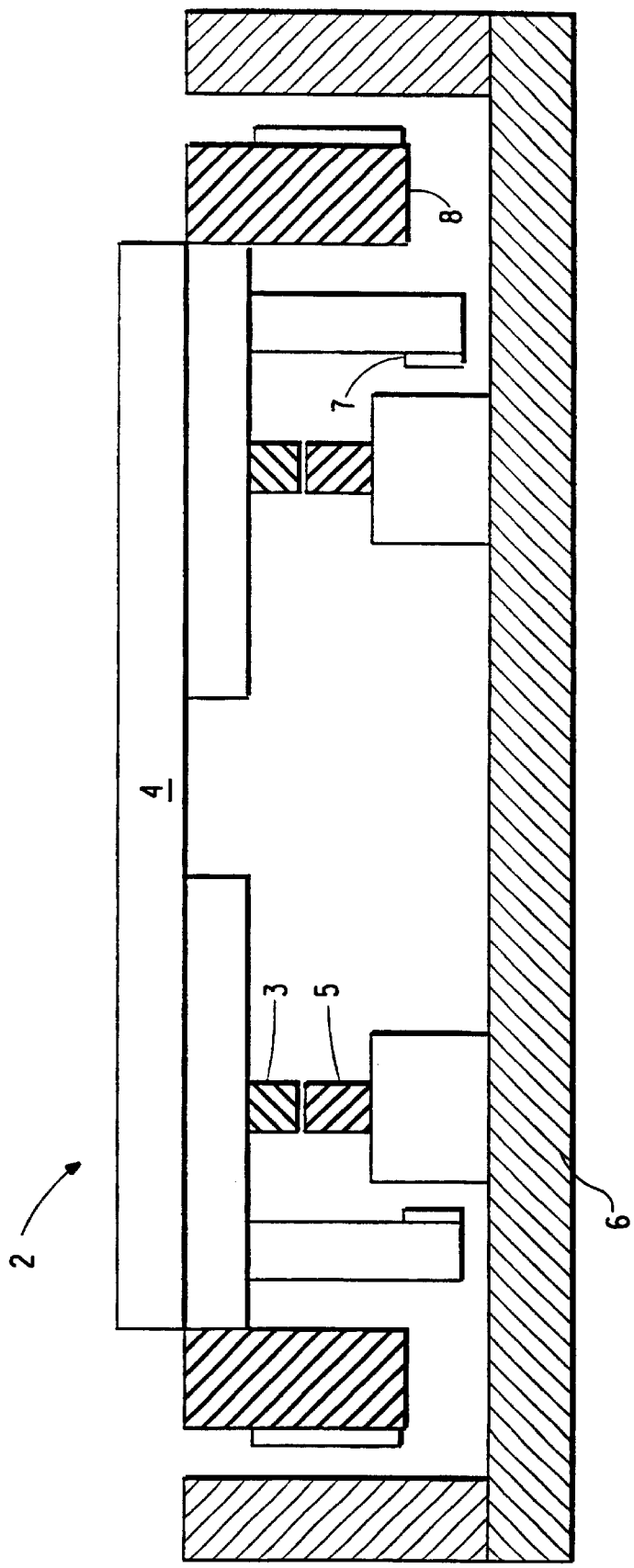
FIG. 1 is a diagrammatic view of a typical prior art system.

Throughout the following detailed description, similar reference numerals refer to similar elements in all figures of the drawings. A set of Cartesian coordinates is shown in the figures to provide a directional frame of reference.

Figure 2:
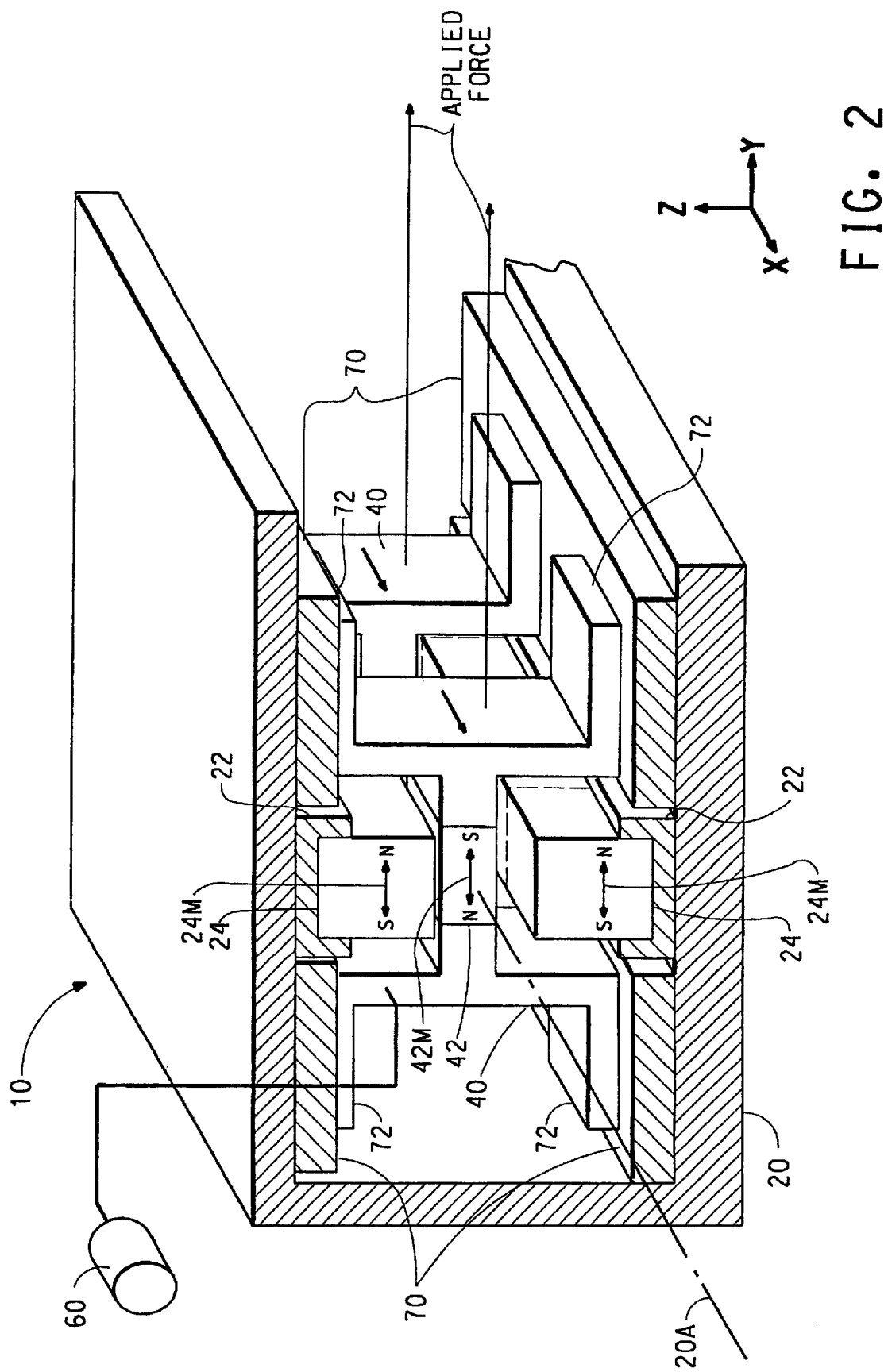
FIG. 2 is a perspective view showing the elements of the present invention.

FIG. 2 shows the overall arrangement of elements in accordance with the present invention. The transport apparatus 10 comprises a track assembly 20 and at least one carriage 40, and a motor 60 for propelling the carriage 40 along the track assembly 20.

The track assembly 20 is arranged along a central axis 20A aligned with the x-axis and comprises one or more track elements 22 and a plurality of track magnets 24 having a magnetization vector indicated by an arrow 24M. Each carriage 40 comprises one or more carriage magnets 42 having a magnetization vector indicated by an arrow 42M. The track magnets 24 and the carriage magnets 42 interact to magnetically support the carriage 40 on the track assembly 20 in a first direction, i.e., the x-axis direction. A passive stabilization means 70 supports the carriage 40 in a second direction, i.e., the z-axis direction, which is orthogonal to the first direction.

Figure 3:
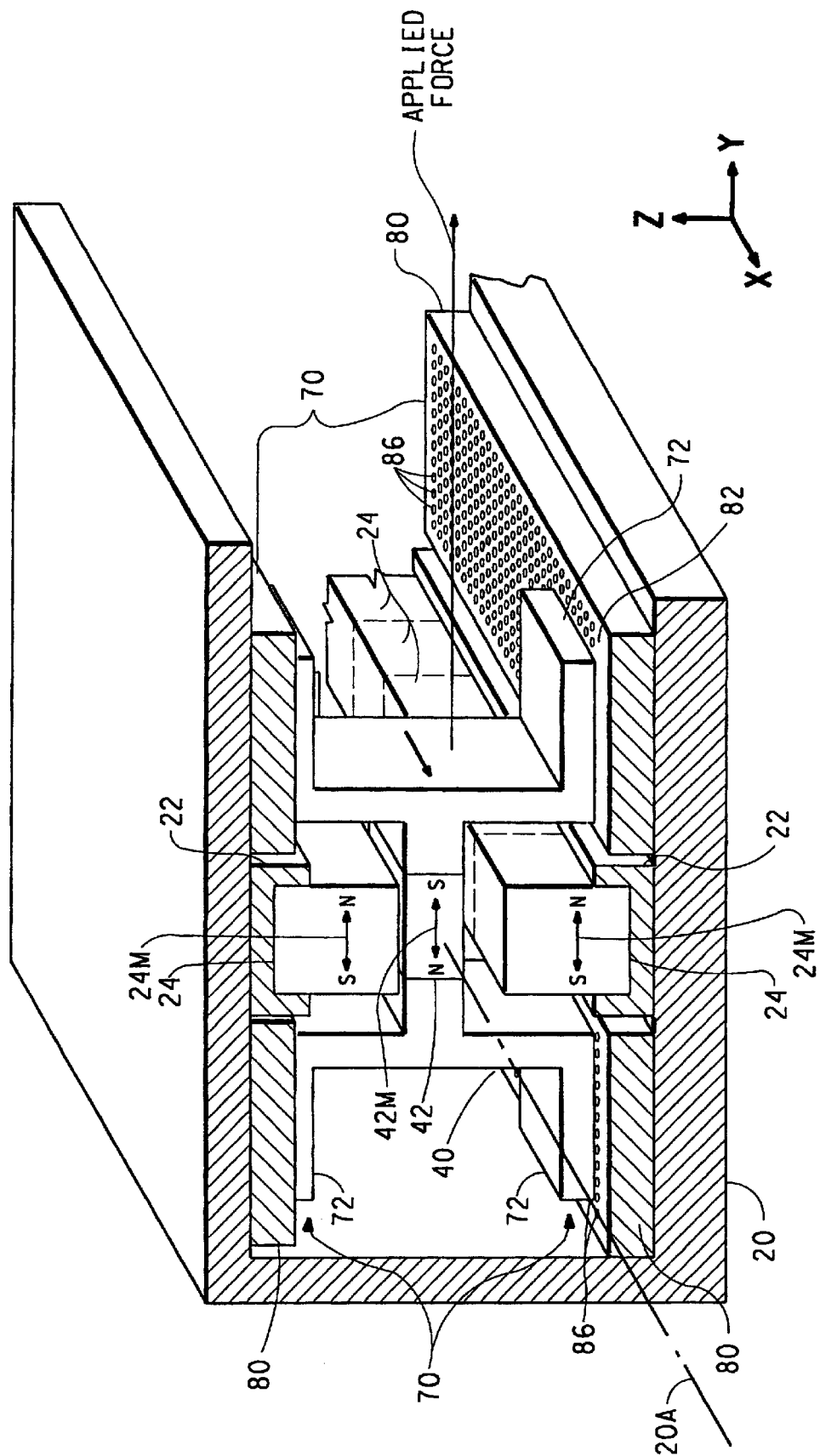
FIG. 3 is a cutaway perspective view of a first embodiment of the present invention.

FIG. 3 shows the structural details of a first arrangement of a first embodiment. The track magnets 24 and the carriage magnets 42 interact to magnetically support the carriage 40 in the track assembly 20 in the y-axis direction, while the passive stabilization means 70 stabilizes the position of the carriage 40 in the magnetically unstable z-axis direction by substantially constraining the motion of the carriage 40 to the xy-plane. A first embodiment of the passive stabilization means 70 is illustrated in FIG. 3 as an air bearing, comprising a pad 72 on the carriage 40 and a slideway 80 mounted to the track assembly 20. The slideway 80 comprises one or more substantially planar gas-permeable bearing surface(s) 82 (also termed "bearing platens") and a gas distribution means 84 (shown in FIG. 4).

Figure 4:
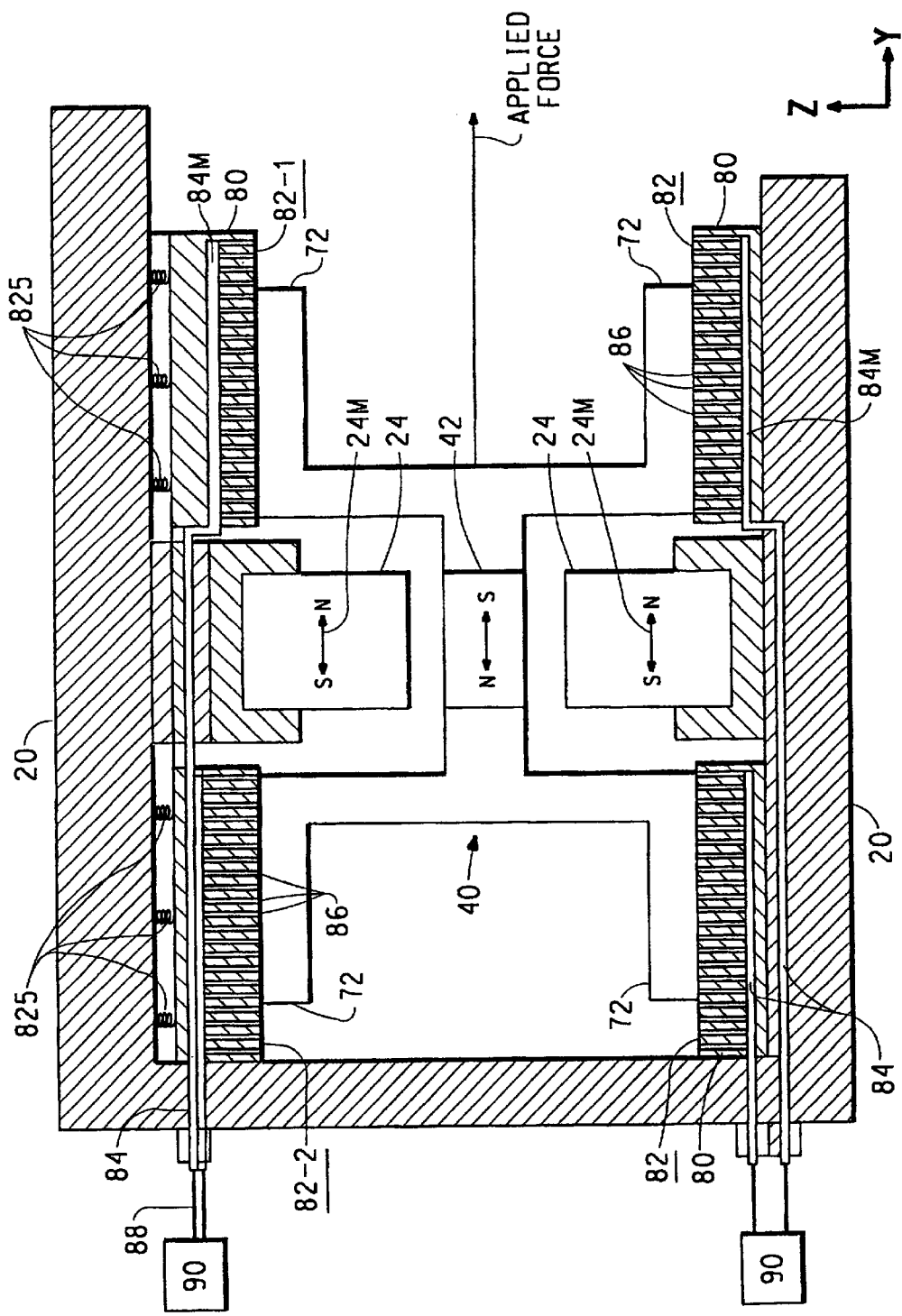
FIG. 4 is a sectional view taken along section lines 4—4 in FIG. 3.

FIG. 4 shows a pressurized gas supply 90 connected to the gas distribution means 84 by a tube 88. The gas-permeable bearing surface 82 may either be porous or have a plurality of orifices 86 thereon as illustrated. The gas distribution means 84 may either be a manifold 84M as shown or may be a permeable substrate within the slideway 80. The pressurized gas supply 90 provides a sufficient flow of gas through the tube 88 and the distribution means 84 and then through the orifices 86 in the gas-permeable surface 82 to support the pad 72 on a thin layer of gas.

FIG. 4 also shows the arrangement of the magnetization vectors in the first embodiment. It may be readily appreciated from FIGS. 3 and 4 that the plane of the bearing platens is oriented generally perpendicular to the magnetically unstable direction, i.e., the plane of the bearing platen surfaces 82 is parallel to the xy-plane, which is perpendicular to the magnetically unstable z-axis direction. The one or more (generally planar) flotation pads 72 are mounted on the carriage 40 such that the plane of each pad 72 is oriented along a plane parallel to the orientation of the corresponding bearing platen 82, so that each floatation pad 72 on the carriage 40 is supported by the corresponding bearing platen surface 82 in a non-contacting, substantially friction-free manner. It may also be appreciated that the track magnets 24 are each displaced in the z-axis direction from the x-axis in a symmetrical manner and have their magnetization vectors 24M oriented in the yz-plane at a predetermined angular direction relative to the z-axis. FIG. 4 shows the magnetization vectors 24M are aligned parallel to the y-axis. FIG. 4 also shows an arrangement of springs 82S that allow bearing platens 82-1 and 82-2 some vertical movement to accommodate minor alignment irregularities of the track assembly 20. These springs 82S both preload the gas bearing and permit the gap between the floatation pads 72 on the carriage 40 and bearing platen surfaces 82 on the track assembly 20 to remain relatively constant without undue manufacturing precision of the track assembly 20.

Figure 4A:
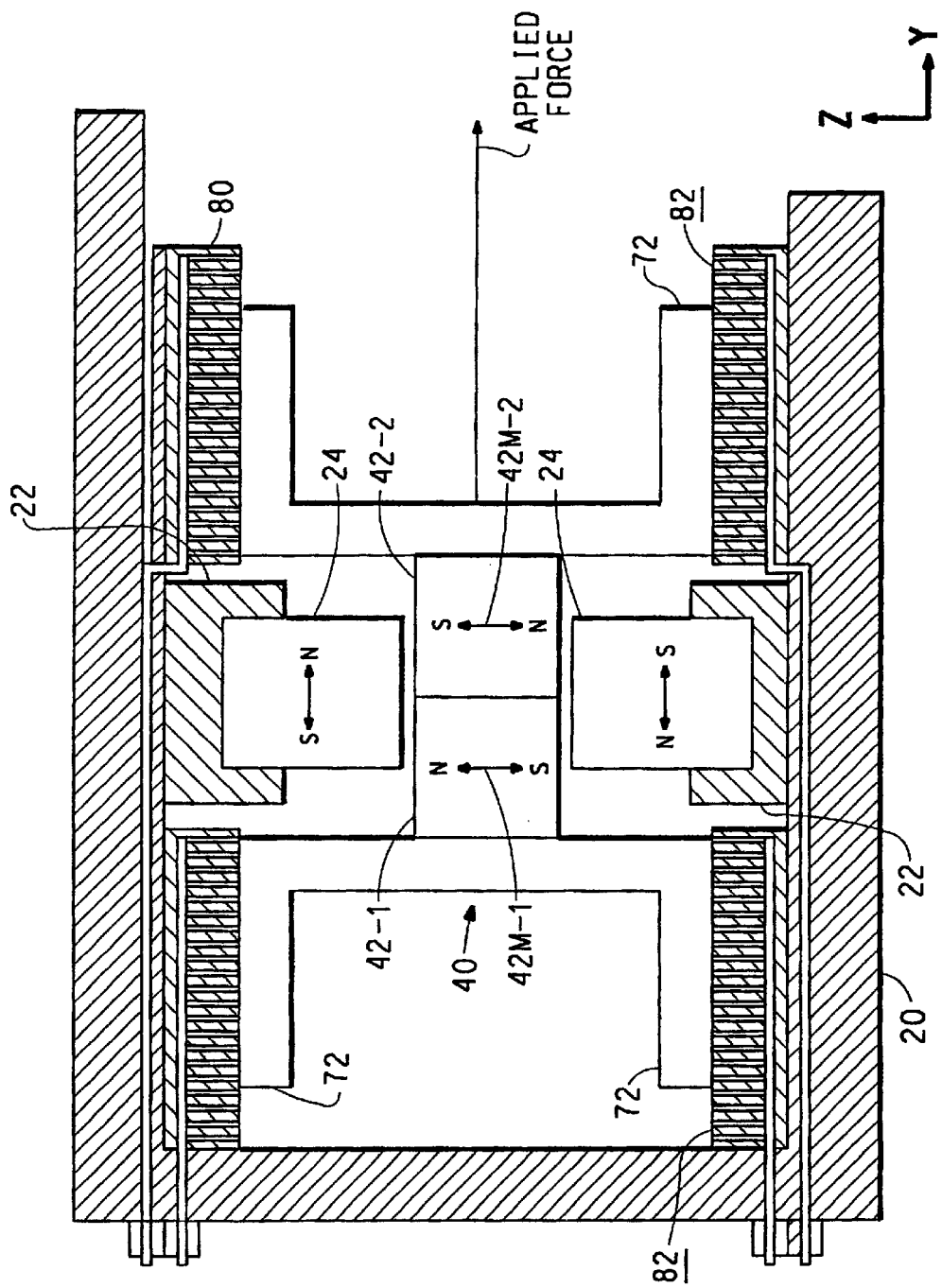
FIG. 4A is a sectional view of an alternate split-magnet arrangement of FIG. 4.
Figure 4B:
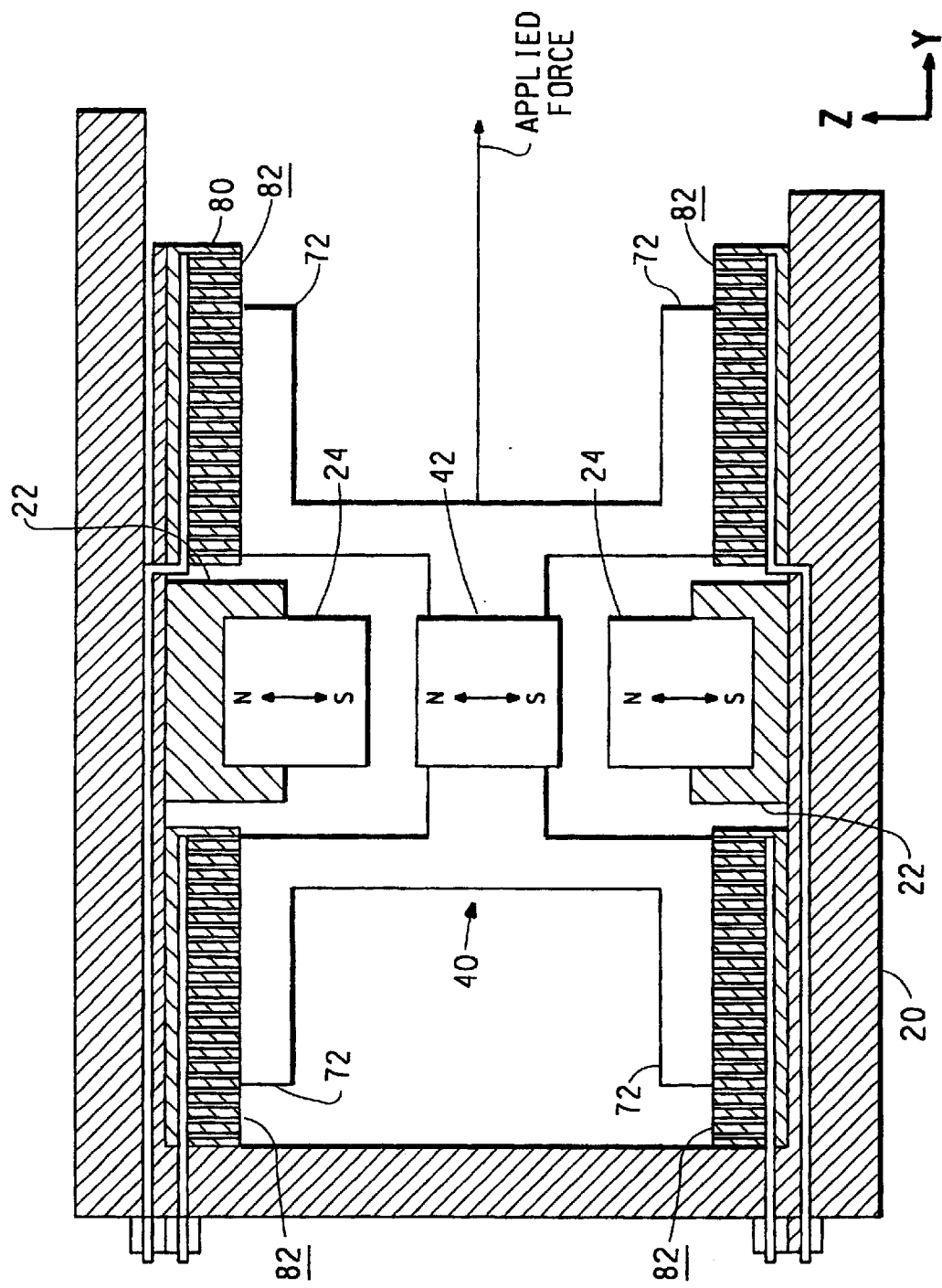
FIG. 4B is a sectional view of an alternate magnet arrangement of FIG. 4.
Figure 4C:
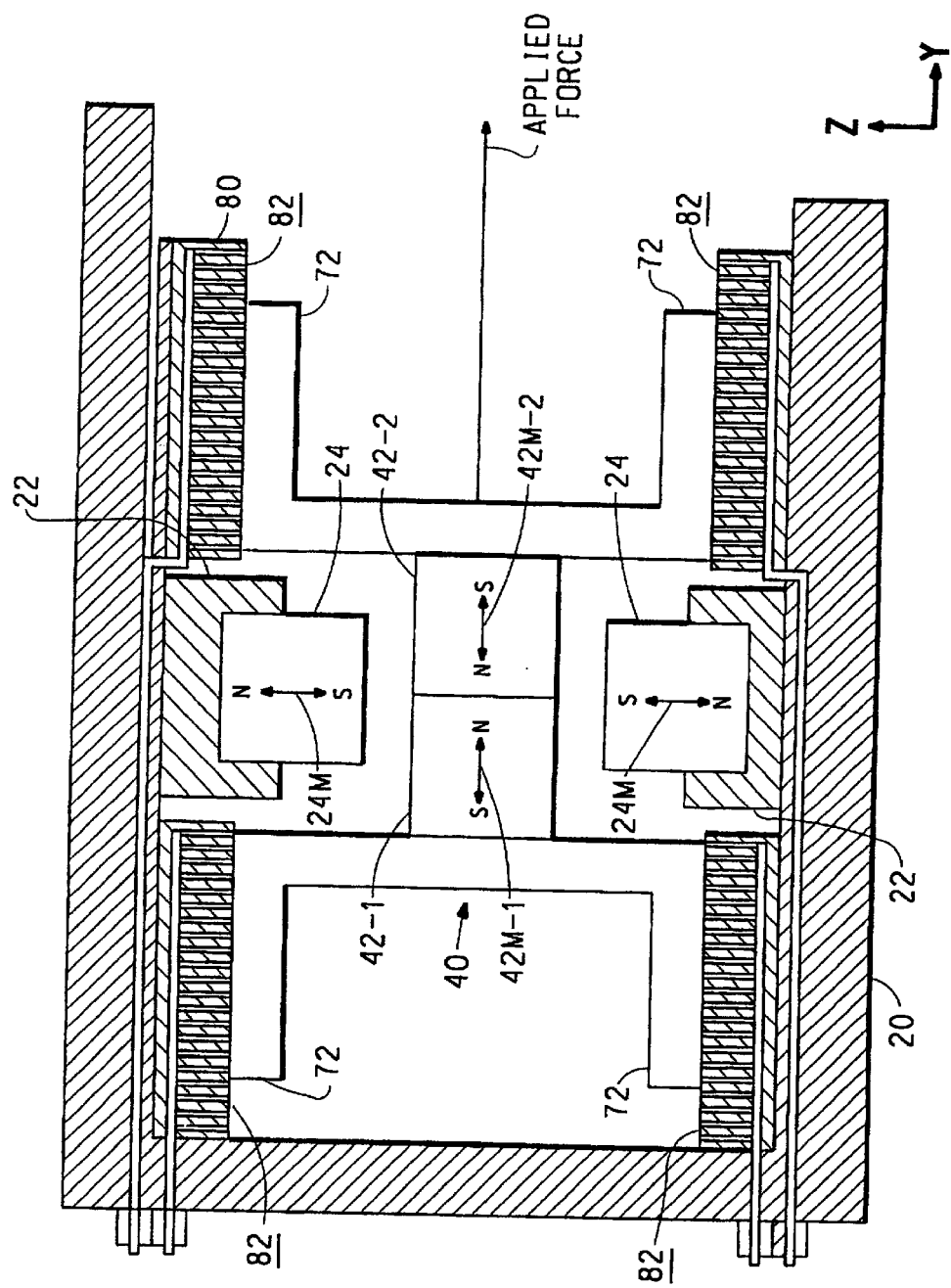
FIG. 4C is a sectional view of an alternate split-magnet arrangement of FIG. 4B.

FIGS. 4A through 4C show alternate magnet arrangements. For simplicity, the spring arrangement of FIG. 4 has been omitted. FIG. 4A shows a split-magnet arrangement, wherein the track magnets 24 have their magnetization vectors aligned as shown in FIG. 4, and the carriage magnet 42 is comprised of two magnets 42-1 and 42-2, each being one-half the size of the carriage magnet 42. The magnetization vector of the carriage magnet 42-1 is aligned parallel to the positive z-axis, and the magnetization vector of the carriage magnet 42-2 is aligned parallel to the negative z-axis. It has been found that such a split-magnet arrangement can achieve a greater restoring force than the magnet arrangement of FIG. 4, while using the same amount of permanent magnet material.

FIG. 4B shows a magnet arrangement wherein the magnetization vectors of the track magnets 24 and the carriage magnet 42 are aligned parallel to the z-axis.

FIG. 4C shows a split-magnet arrangement, wherein the track magnets 24 have their magnetization vectors aligned as shown in FIG. 4B, and the carriage magnet 42 is comprised of two magnets 42-1 and 42-2, each one-half the size of the carriage magnet 42. The magnetization vector of the carriage magnet 42-1 is aligned parallel to the positive y-axis, and the magnetization vector of the carriage magnet 42-2 is aligned parallel to the negative y-axis. It has been found that such a split-magnet arrangement can achieve a greater restoring force than the arrangement of FIG. 4B, while using the same amount of permanent magnet material.

Figure 5:
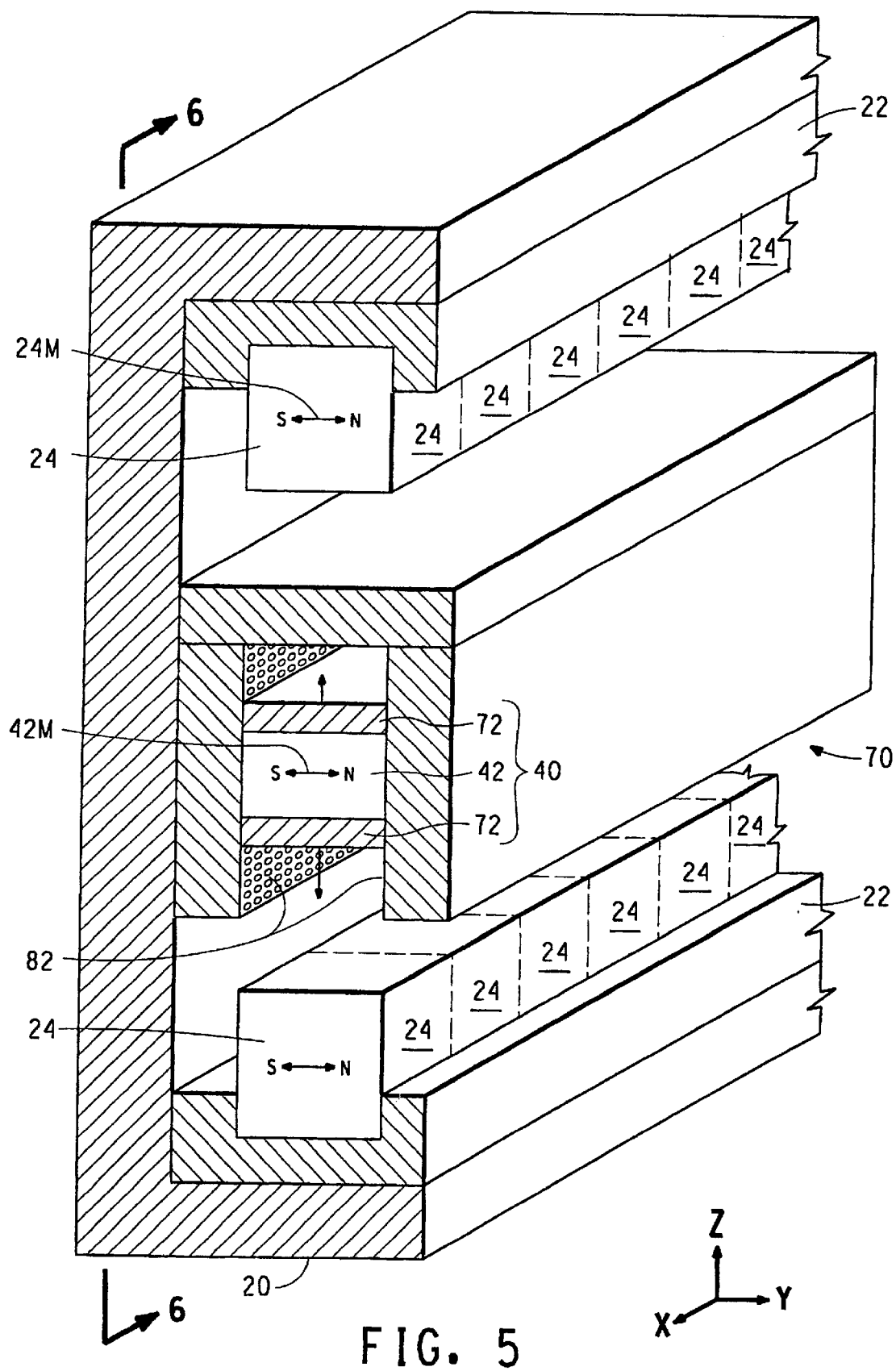
FIG. 5 is a perspective view of a second embodiment of the present invention.
Figure 6:
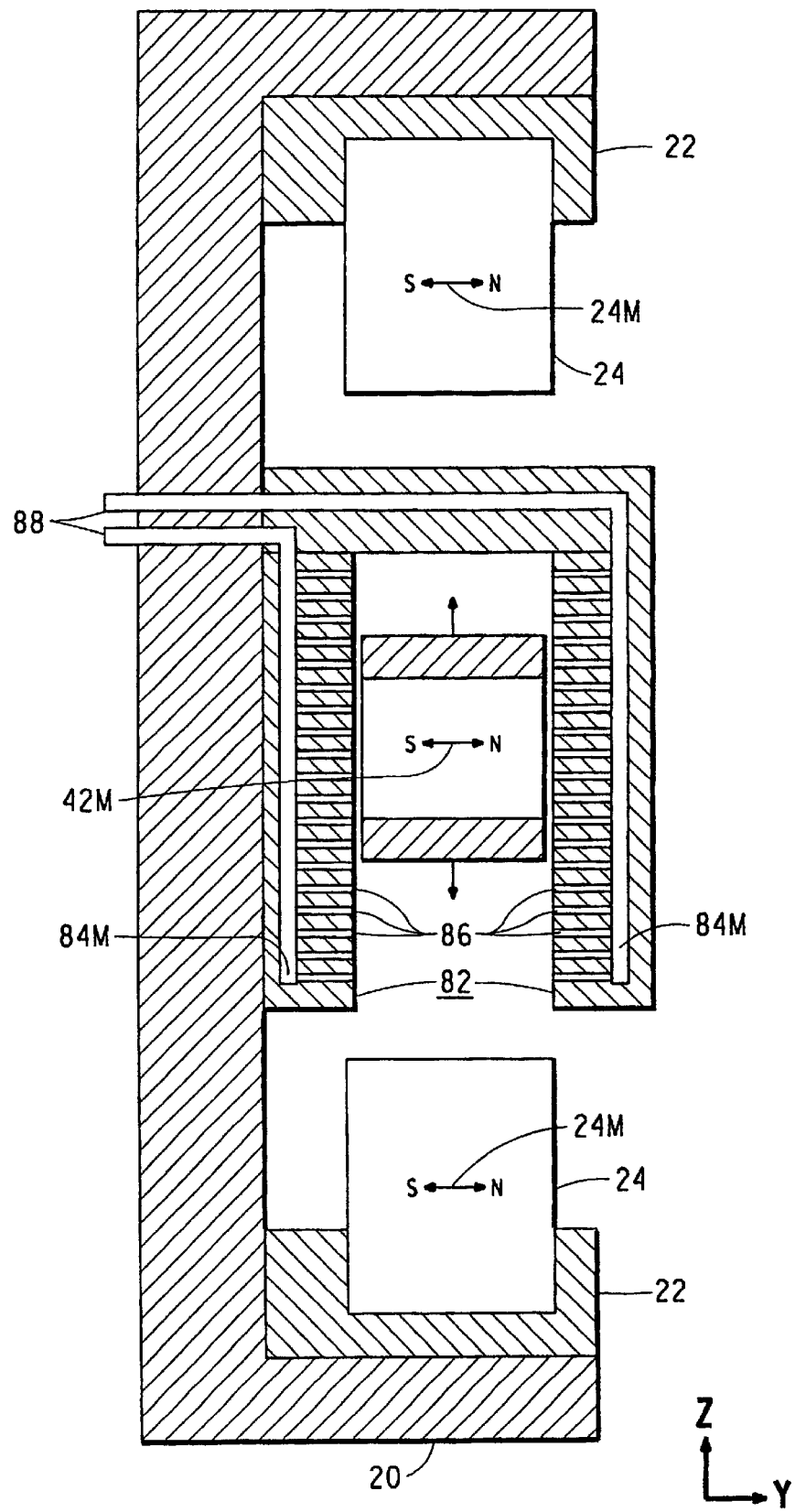
FIG. 6 is a sectional view taken along section lines 6—6 in FIG. 5.
Figure 8A:
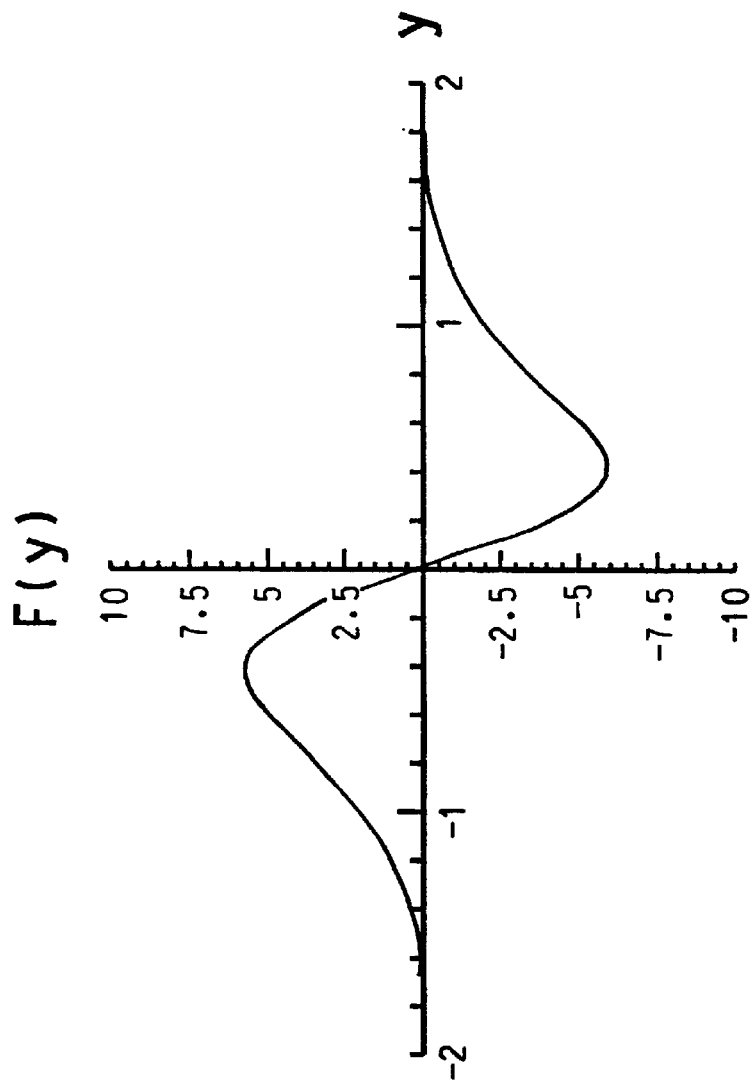
FIGS. 8A through 8G are plots which respectively correspond to FIGS. 7A through 7G, showing the relationship between the magnetic restoring force and the lateral carriage displacement distance.
Figure 7A:
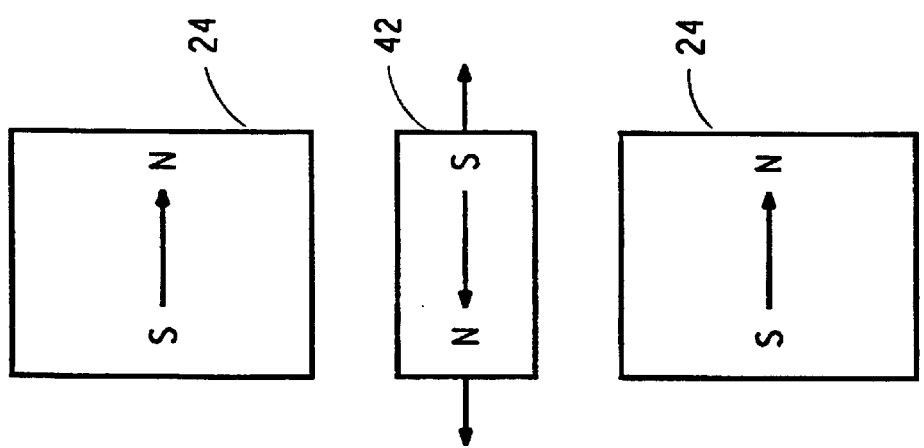
FIGS. 7A through 7G are sectional views taken along the same section lines as in FIG. 4, illustrating a first group of alternate arrangements of the first embodiment, wherein the magnetization vectors of the track magnets have been rotated in opposite directions.
Figure 8B:
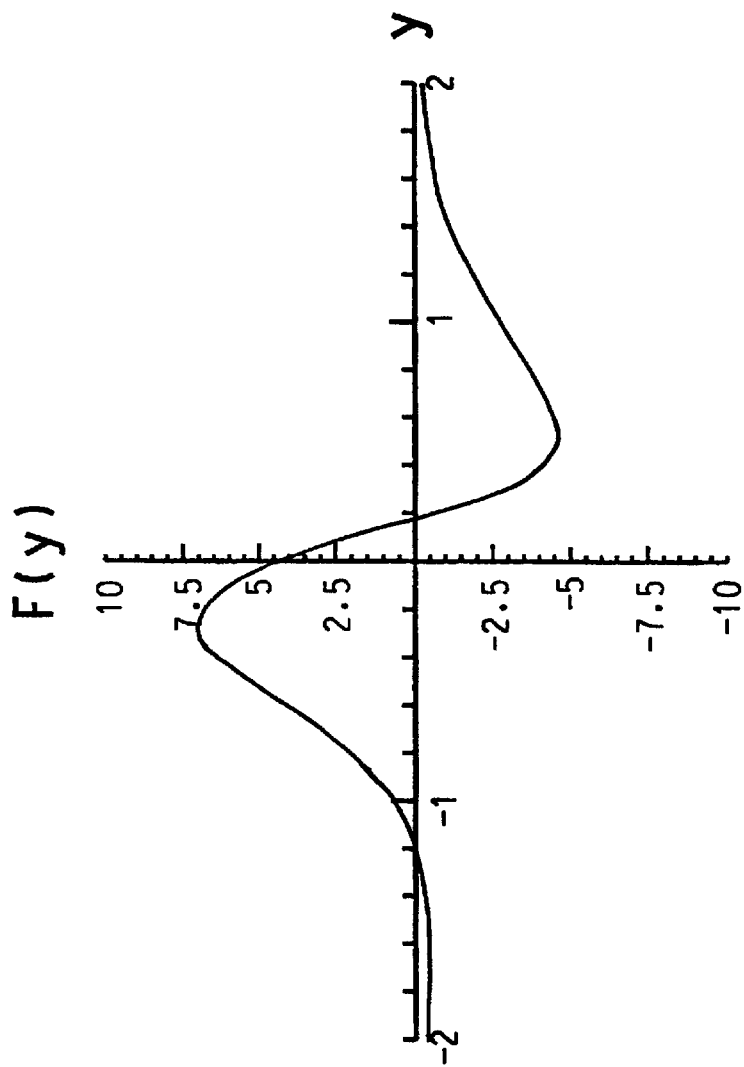
Figure 7B:
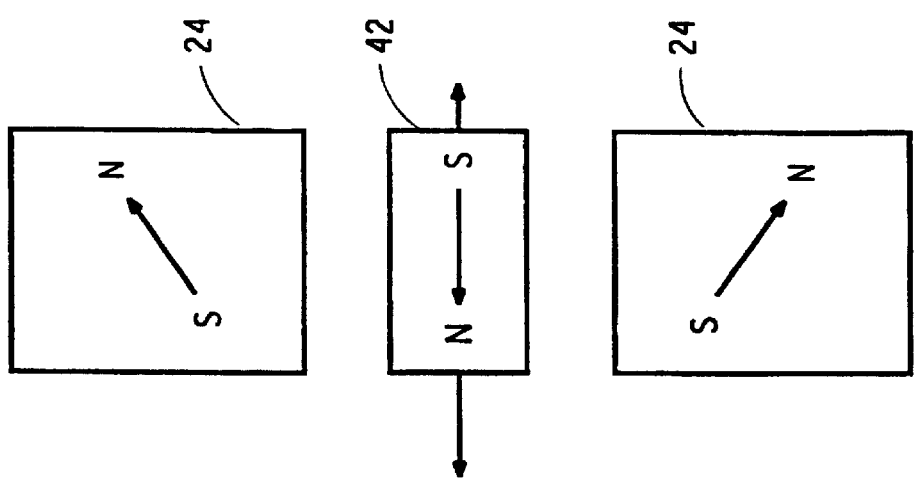
Figure 8C:
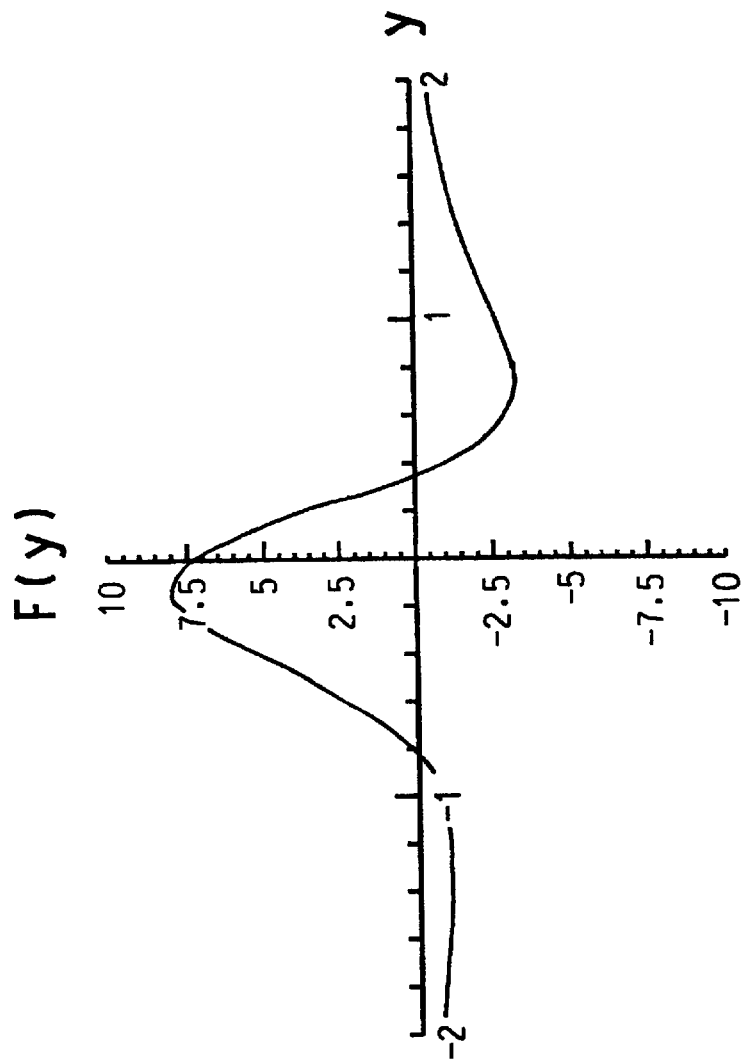
Figure 7C:
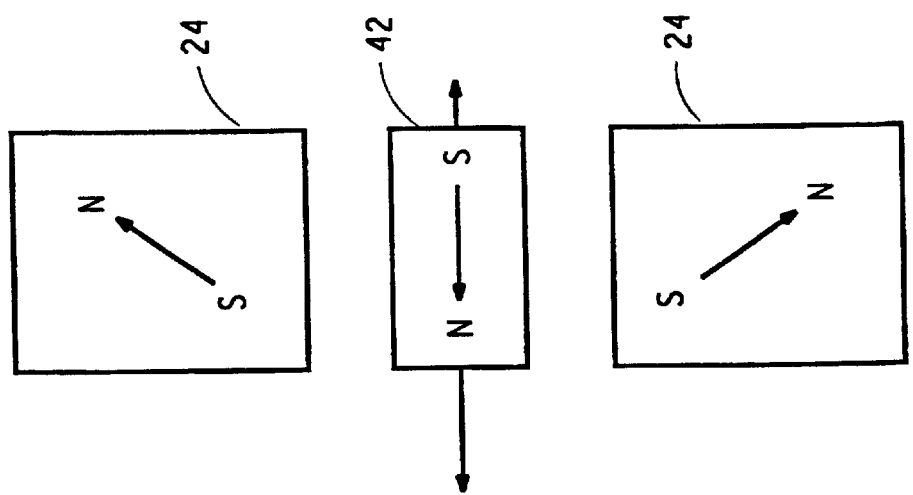
Figure 8D:
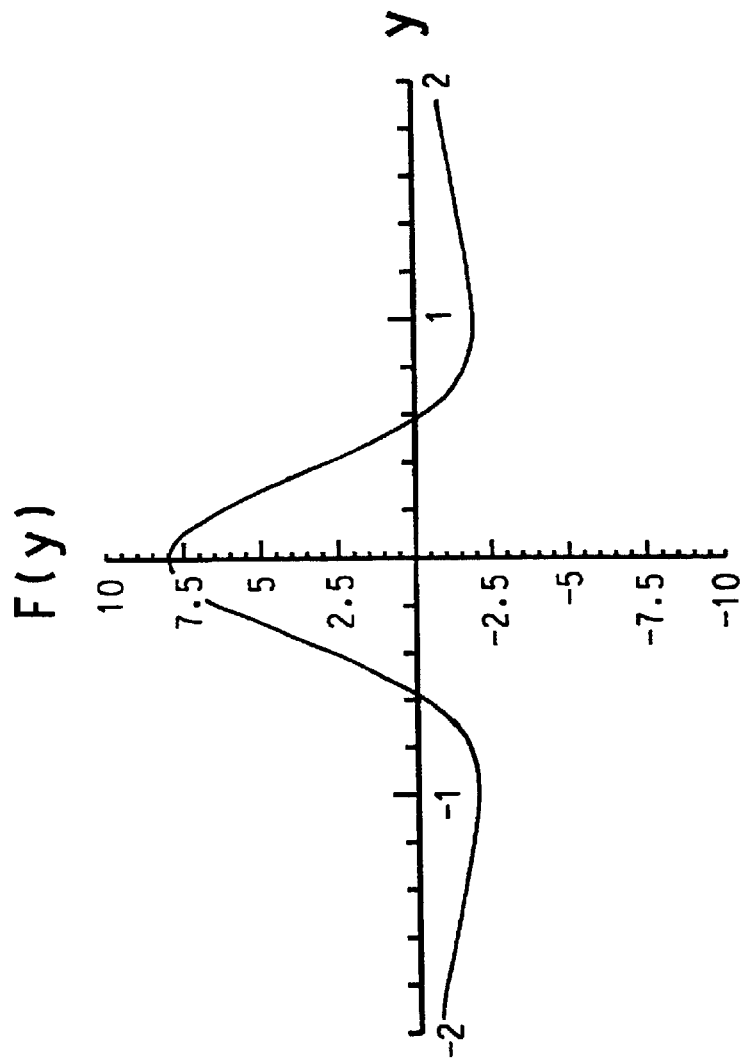
Figure 7D:
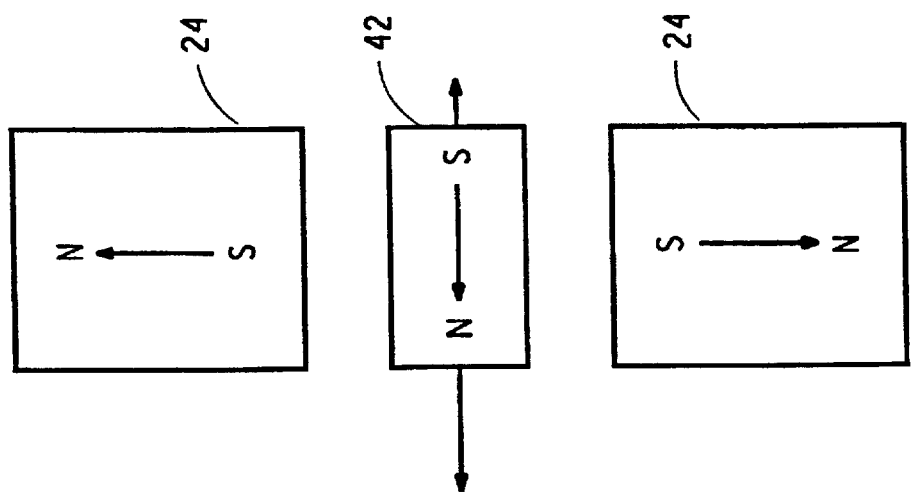
Figure 8E:
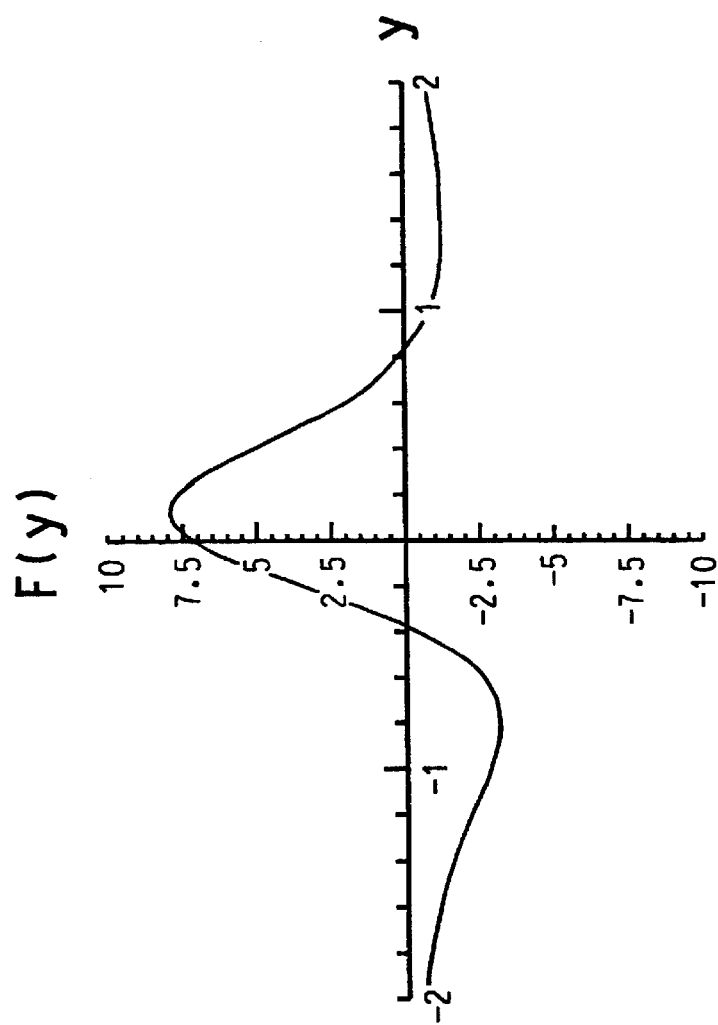
Figure 7E:
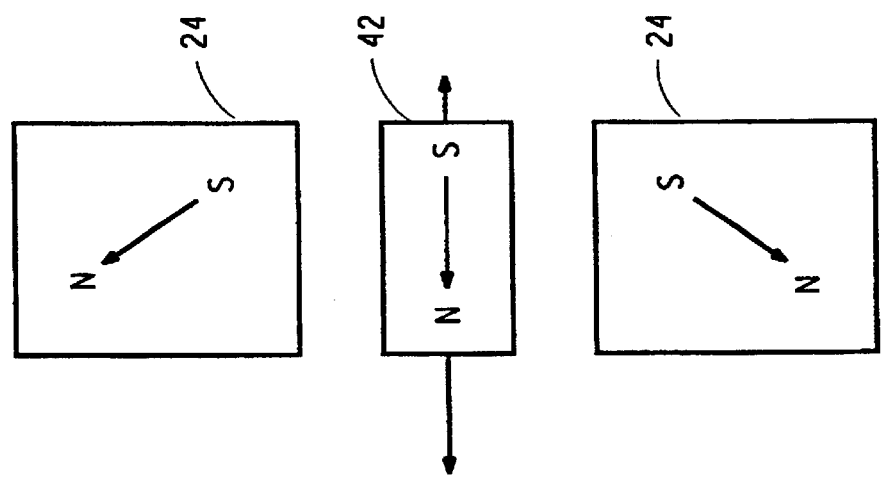
Figure 8F:
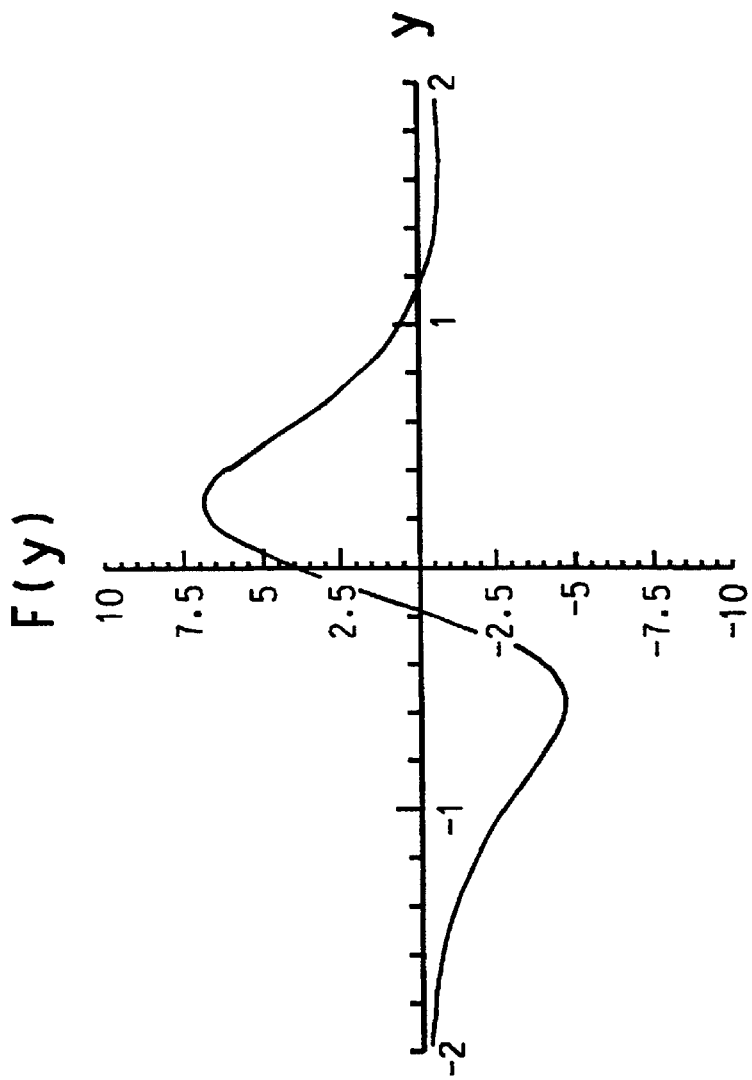
Figure 7F:
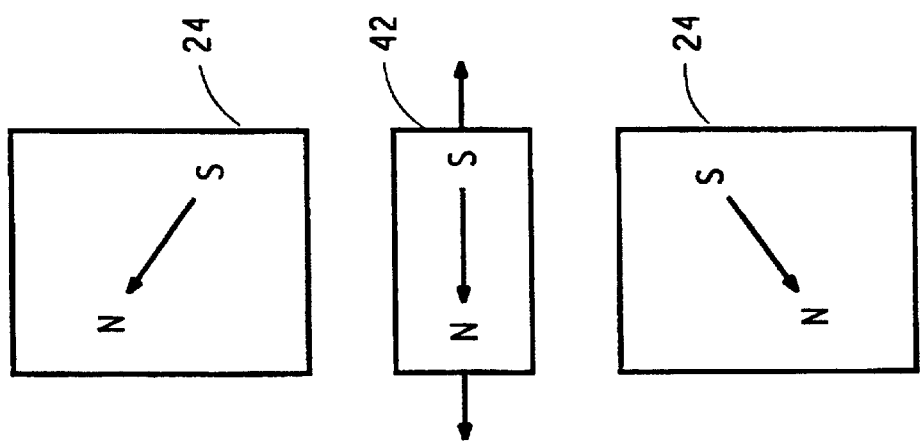
Figure 8G:
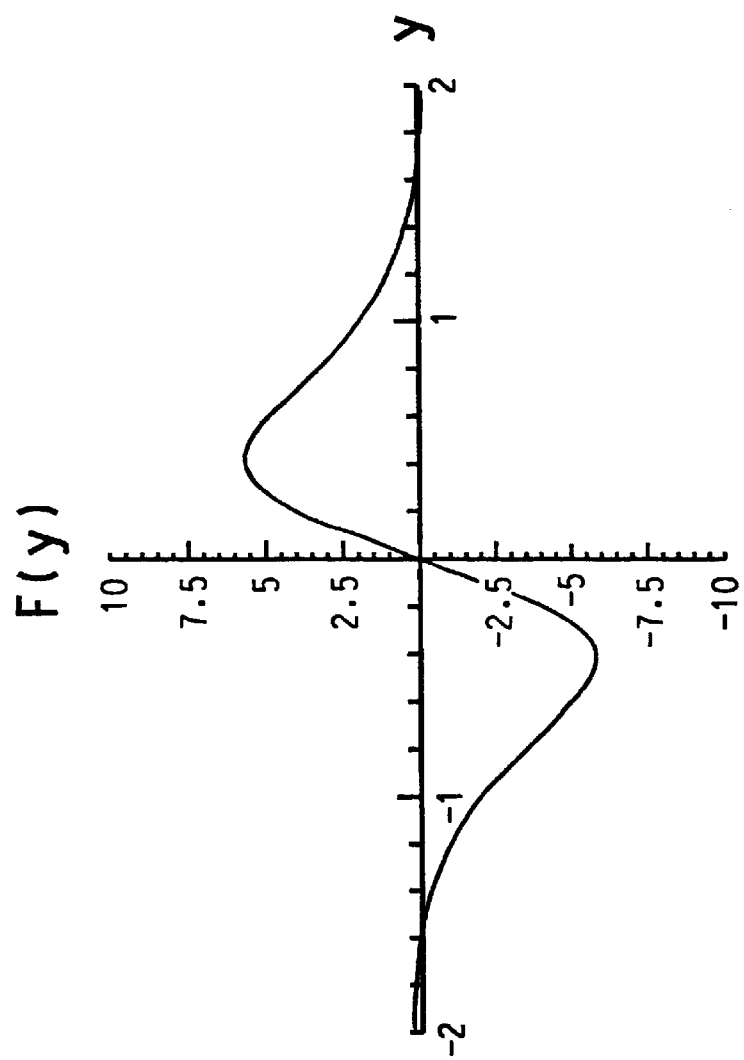
Figure 7G:
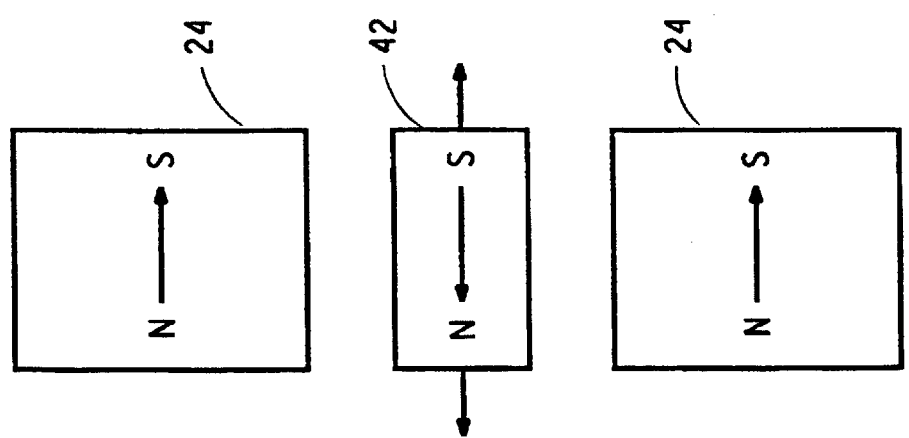

FIG. 5 shows an apparatus in accordance with a second embodiment of the invention. The track magnets 24 and the carriage magnets 42 interact to magnetically support the carriage 40 in the track assembly 20 in the z-axis direction, while the passive stabilization means 70 stabilizes the position of the carriage 40 in the magnetically unstable y-axis direction by substantially constraining the motion of the carriage 40 to the xz-plane. FIG. 6 shows the arrangement of the magnetization vectors 24M of the track magnets 24, and the magnetization vector 42M of the carriage magnet 42. It may be readily appreciated from FIGS. 5 and 6 that the plane of the bearing platens is oriented generally perpendicular to the magnetically unstable direction, i.e., the plane of the bearing platens 82 is parallel to the xz-plane, which is perpendicular to the magnetically unstable y-axis direction.

FIGS. 7A through 7G show a series of alternate magnet arrangements, wherein the magnetization vectors of the track magnets 24 have been rotated in opposite directions. In each of the FIGS. 7A through 7G, the carriage magnet 42 is illustrated in its stable y-axis position, i.e., that position in which the net force in the y-axis direction is zero. When the magnetization vectors of the track magnets 24 are rotated in opposite directions in this symmetrical manner, the relationship between the magnetic restoring force and the lateral carriage displacement distance will be altered, as may be seen in the respective corresponding plots in FIGS. 8A through 8G. These plots show the relationship between the magnetic restoring force (plotted vertically) and the lateral carriage displacement distance (plotted horizontally) for specific rotation angles of the magnetization vectors of the track magnets 24.

It should be noted that the magnetic stiffness at a given y-axis position of the carriage magnet 42 is proportional to the slope of the force-displacement curve. The magnetic stiffness of the magnet arrangement of this first embodiment may thus be "tuned" to the desired value by selecting the appropriate rotation angle of the magnetization vectors of the track magnets 24. It should also be understood that any rotation angle, intermediate to the angles illustrated, may be employed and remain within the scope of the invention.

Figure 10A:
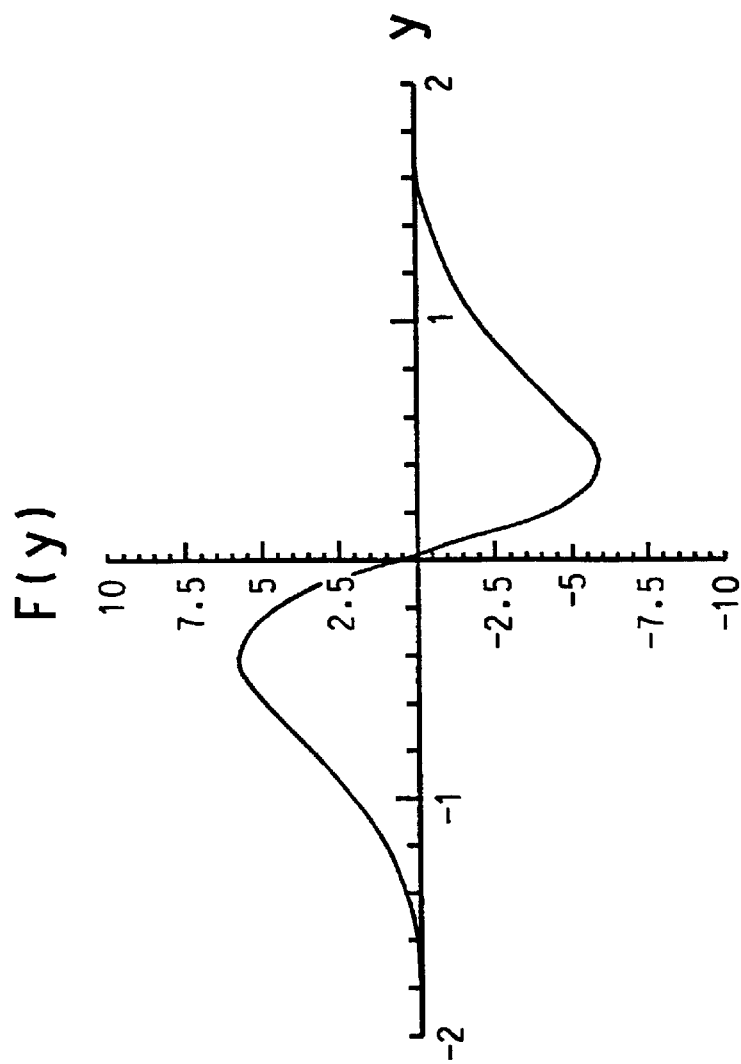
FIGS. 10A and 10B are plots which correspond to FIGS. 9A and 9B, showing the relationship between the magnetic restoring force and the lateral carriage displacement distance.
Figure 9A:
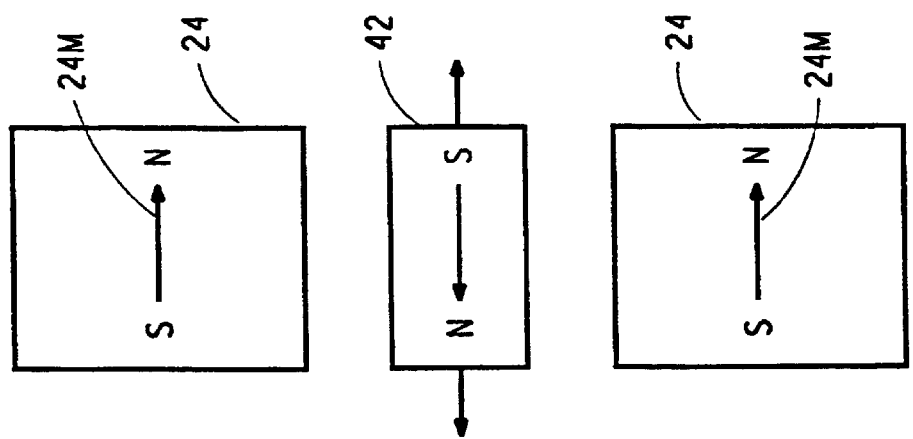
FIGS. 9A and 9B are sectional views taken along the same section lines as in FIG. 4, illustrating a second group of alternate arrangements of the first embodiment, wherein the magnetization vectors of the carriage magnet have been rotated in a first direction and the magnetization vectors of the track magnets have been rotated in an opposite direction.
Figure 10B:
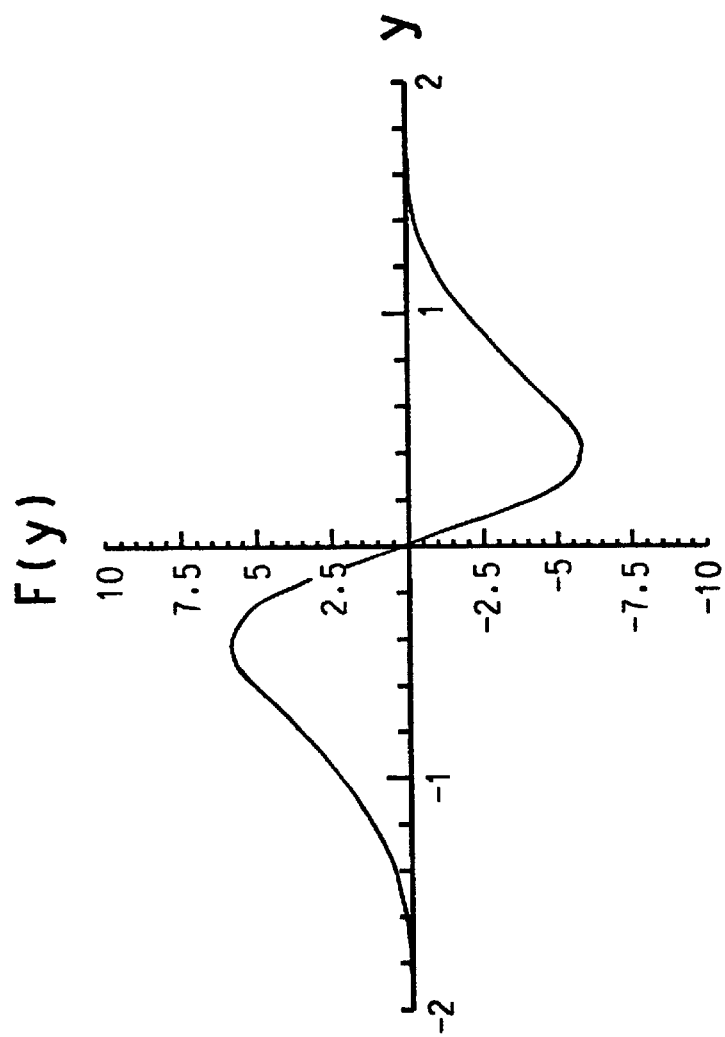
Figure 9B:
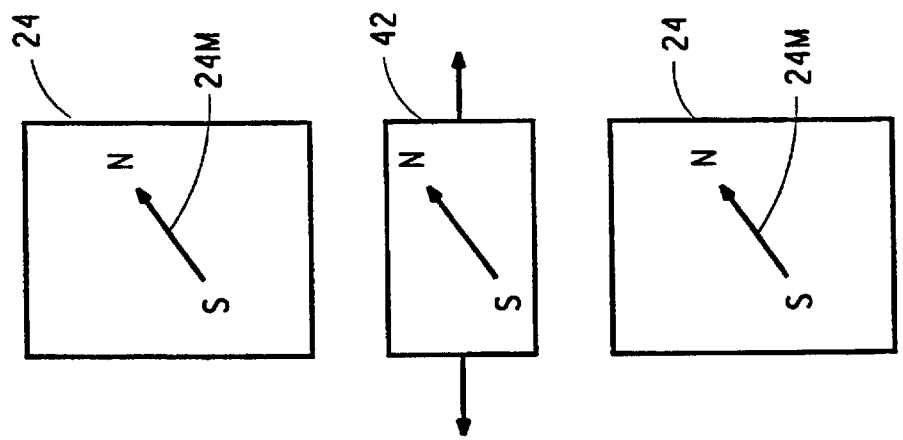

If the magnetization vectors of the carriage magnet 42 is rotated in a first direction by a predetermined angle, and the magnetization vectors of the track magnets 24 are rotated in an opposite direction by the same angle, as seen in FIGS. 9A and 9B, the relationship between the magnetic restoring force and the lateral carriage displacement distance will not be altered, as may be seen in the respective corresponding plots in FIGS. 10A and 10B. These plots show the relationship between the magnetic restoring force and the lateral carriage displacement distance for specific rotation angles. It should be understood that any rotation angle, intermediate to the angles illustrated, may be employed and remain within the scope of the invention.

Figure 11:
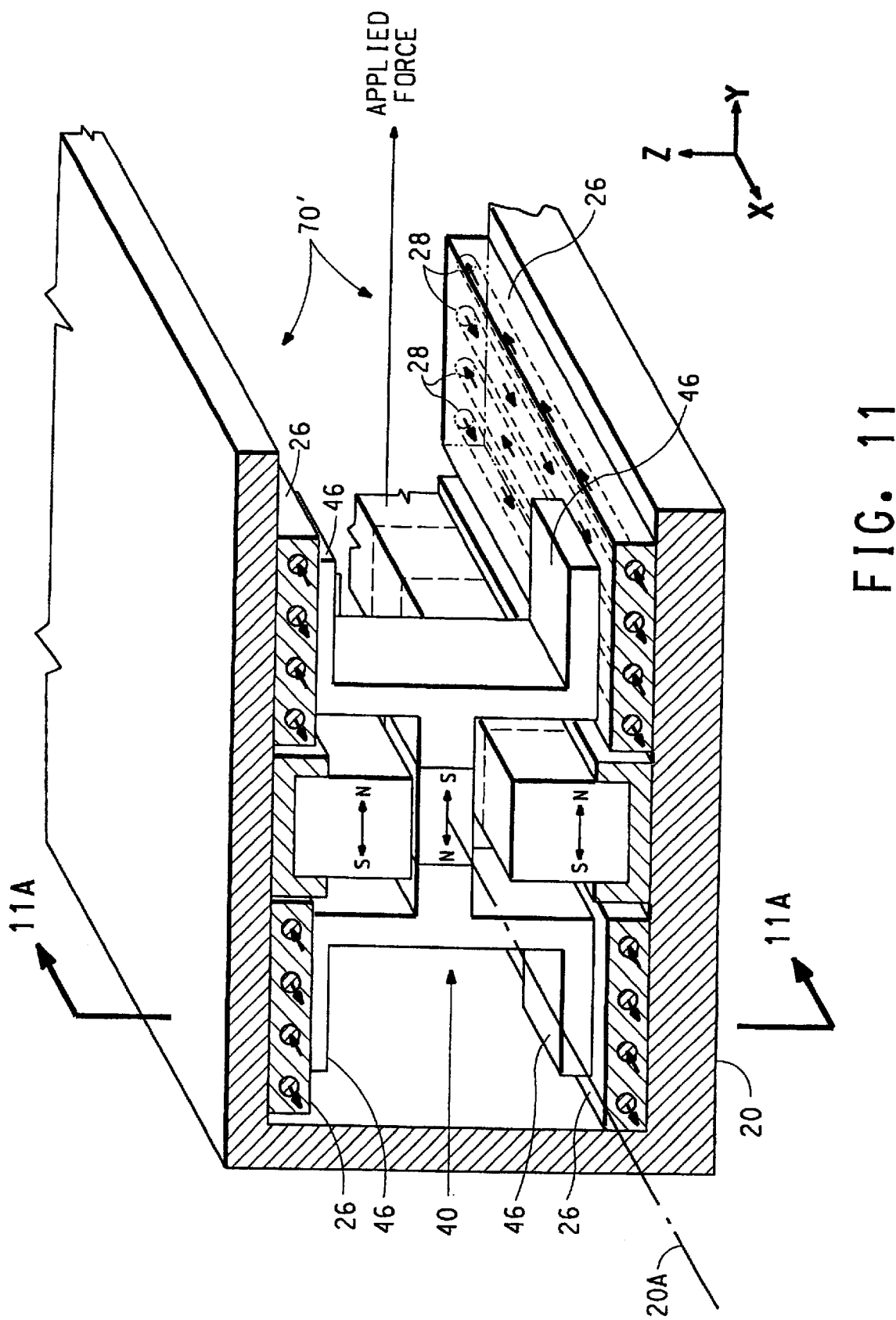
FIG. 11 is a perspective view of an apparatus employing a magnetic eddy current stabilization means.
Figure 11A:
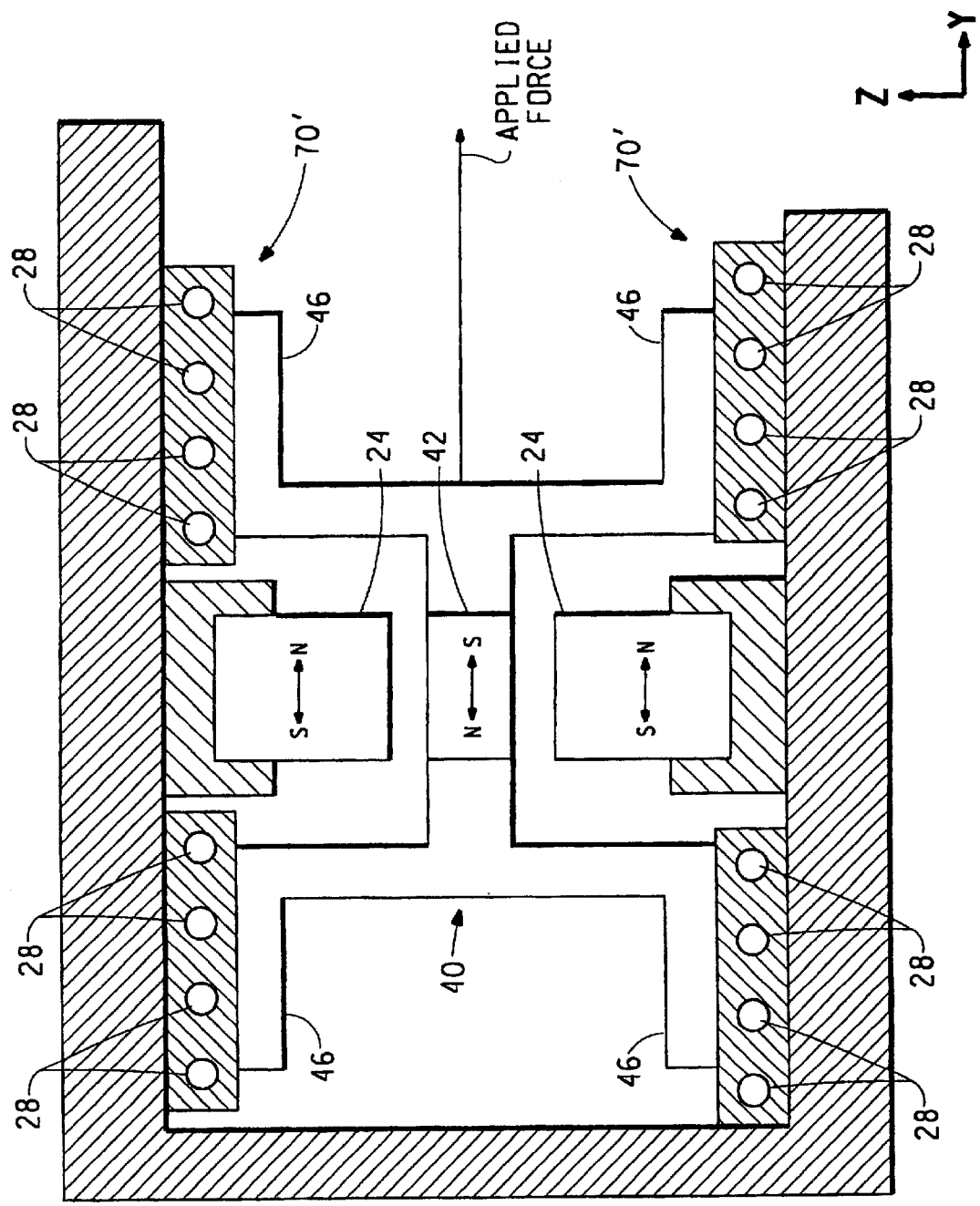
FIG. 11A is a sectional view taken along section lines 11A—11A in FIG. 11.

As an alternative to the passive stabilization means 70 of FIG. 3, FIGS. 11 and 11A show an apparatus employing a magnetic eddy current stabilization means 70'. An electrical conductor 26 in the form of an elongated coil 28 is mounted on the track assembly 22. The coil 28 is energized by an AC power source, such as a single phase electrical power line (not shown), to produce an alternating magnetic field adjacent the conductor 26. The alternating magnetic field interacts with a conductor plate 46 mounted on the carriage 40 to produce eddy currents in the conductor plate 46, which results in a repulsive force between the coil 28 and the plate 46.

Figure 12:
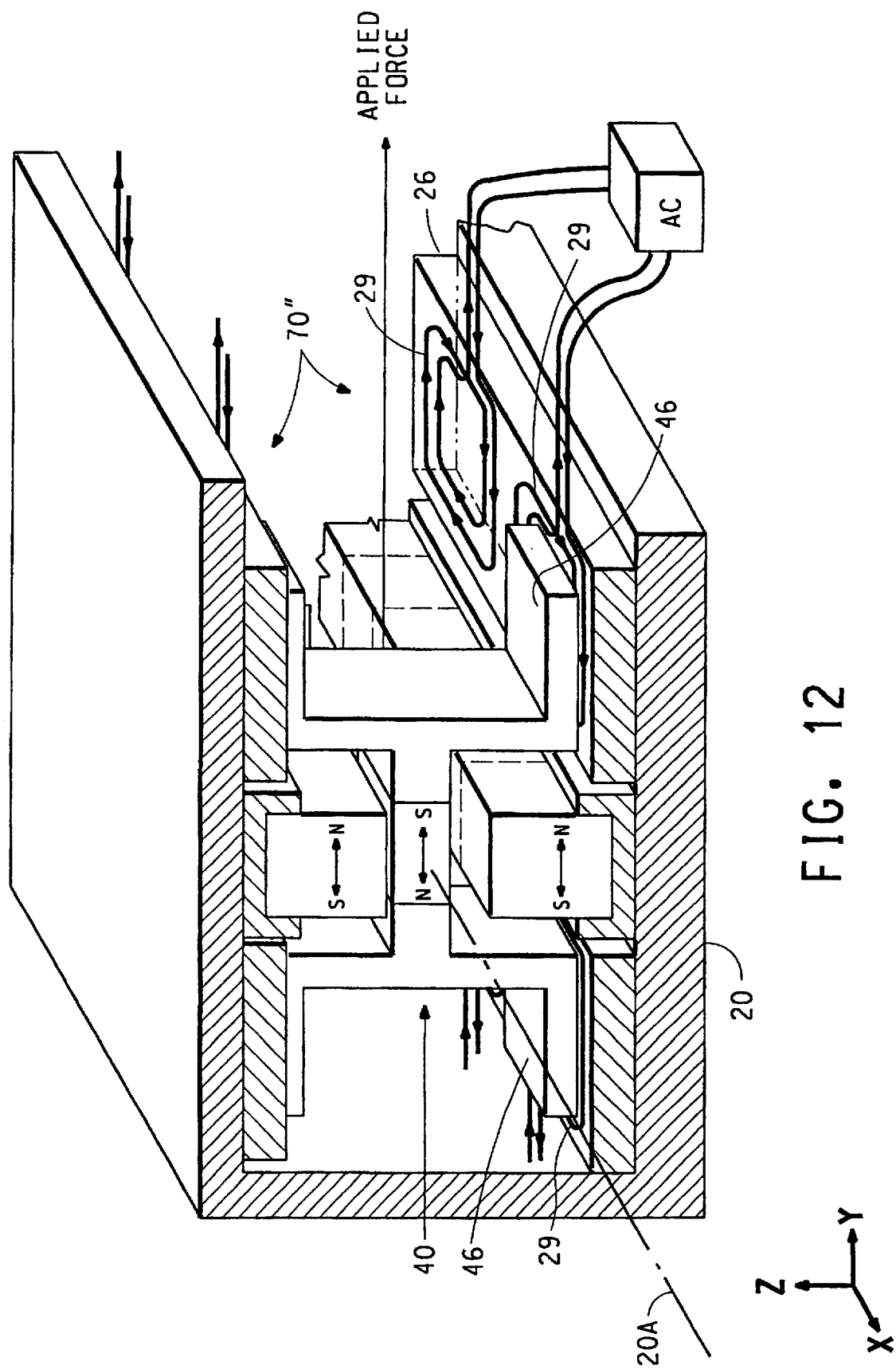
FIG. 12 is a perspective view of an apparatus employing a multi-coil magnetic eddy current stabilization means driven by a power source.

FIG. 12 shows an apparatus employing a multi-coil magnetic eddy current stabilization means 70" driven by a power source. Although this apparatus is illustrated with two coils 29, any number of coils 29 may be employed. Two electrical conductors 26 in the form of elongated coils 29 are arranged in a side-by-side manner, as shown, and mounted on the track assembly 22. The coils 29 are energized by a power source to produce alternating magnetic fields adjacent the conductors 26. The alternating magnetic fields interact with a conductor plate 46 mounted on the carriage 40 to produce eddy currents in the plate 46, which results in a repulsive force between the coils 29 and the plate 46.

Figure 13:
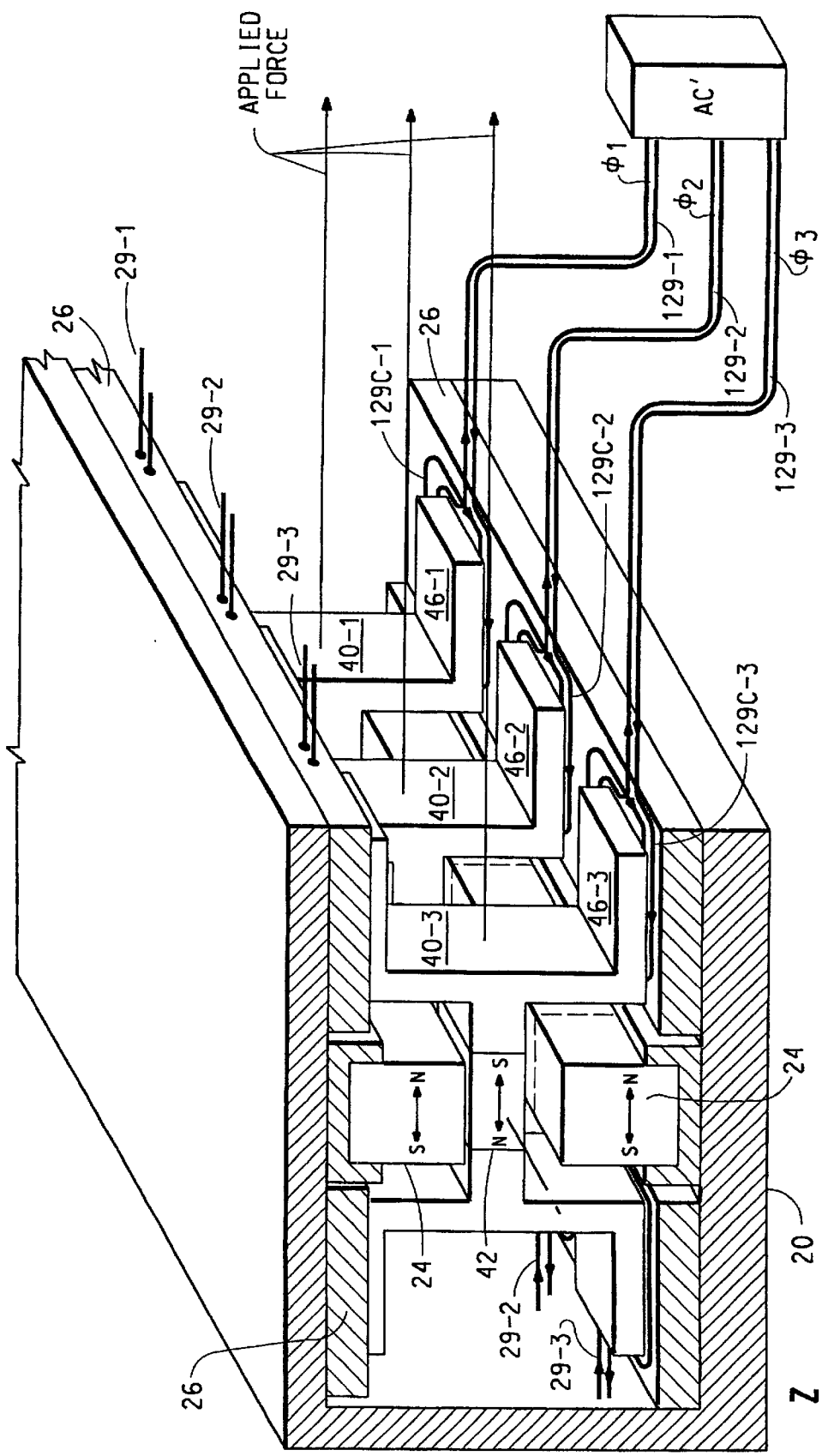
FIG. 13 is a perspective view of an apparatus employing a multi-phase magnetic eddy current stabilization means driven by a multi-phase power source.

FIG. 13 shows an apparatus employing a magnetic eddy current stabilization means 70" driven by a multi-phase power source. Although this power source is illustrated with three phases, any number of phases may be employed. Three electrical conductors 129-1, 129-2 and 129-3 in the form of elongated coils 129C1, 129C2 and 129C3, associated with phase numbers $\Phi_1$, $\Phi_2$ and $\Phi_3$, respectively, are interleaved as shown and mounted on the track assembly 22. The coils 129C1, 129C2 and 129C3 are energized by a three-phase power source, such as a three-phase electrical power line (not shown), to produce alternating magnetic fields adjacent to each coil 129C1, 129C2 and 129C3. The alternating magnetic fields interact with each conductor plate 46 mounted on the carriage 40 to produce eddy currents in the plate 46 adjacent the respective coil, which results in a repulsive force between the coils 129C1, 129C2 and 129C3 and the respective plate 46.

Figure 14:
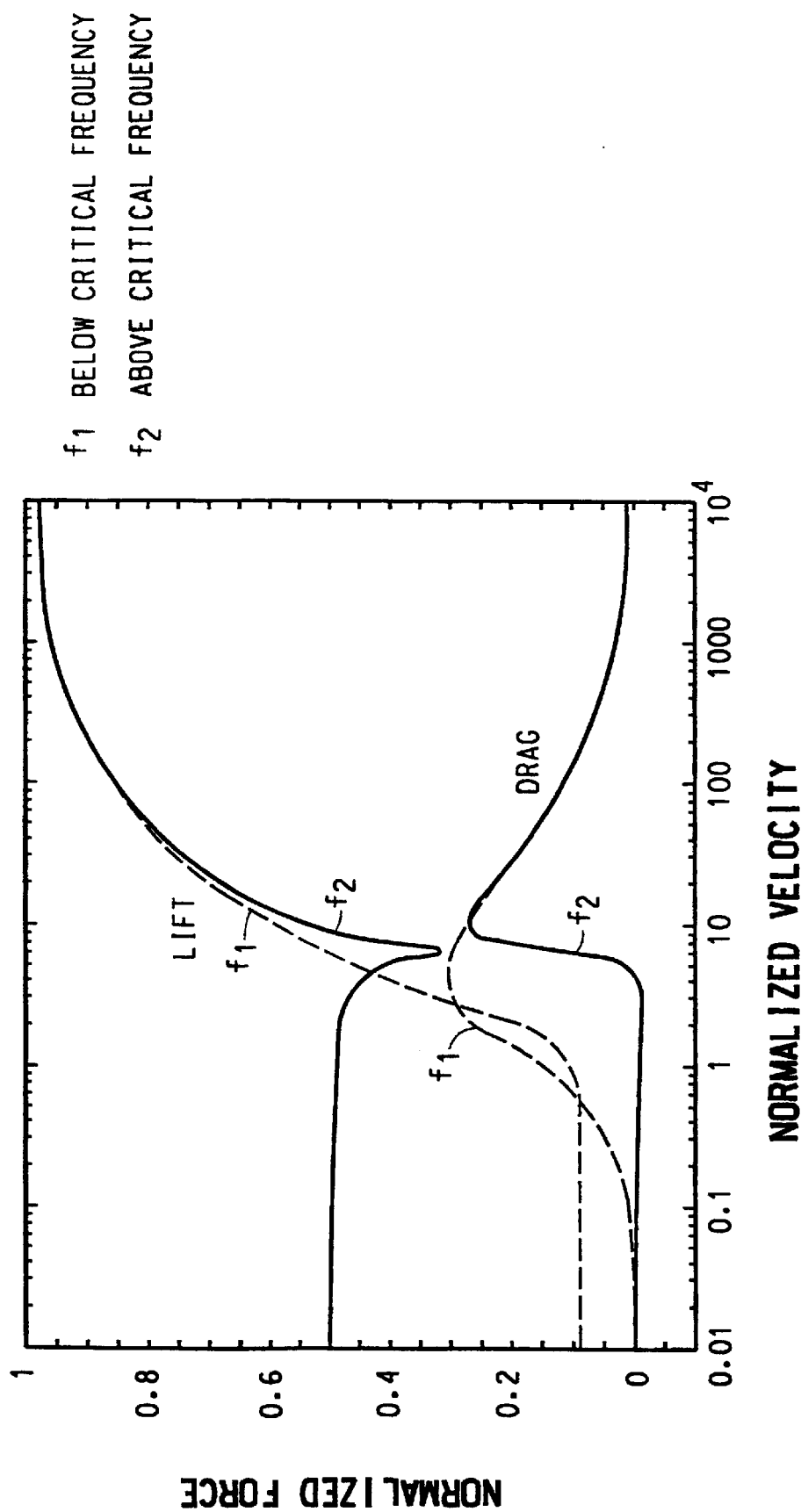
FIG. 14 is a plot showing the relationship between magnetic drag and carriage velocity, and the relationship between magnetic stabilization force and carriage velocity.

FIG. 14 is a plot showing the relationship between magnetic drag force and carriage velocity, and the relationship between magnetic stabilization force and carriage velocity for the eddy current stabilization means of FIG. 13.

Exemplary Implementations—In use, the carriage transporter of the present invention supports a carriage between two portions of a track assembly, as shown in FIGS. 2 through 4. One specific application of this carriage transporter is in a tenter frame used to support and stretch a web, such as a thermoplastic polymeric film, during manufacturing.

Figure 15:
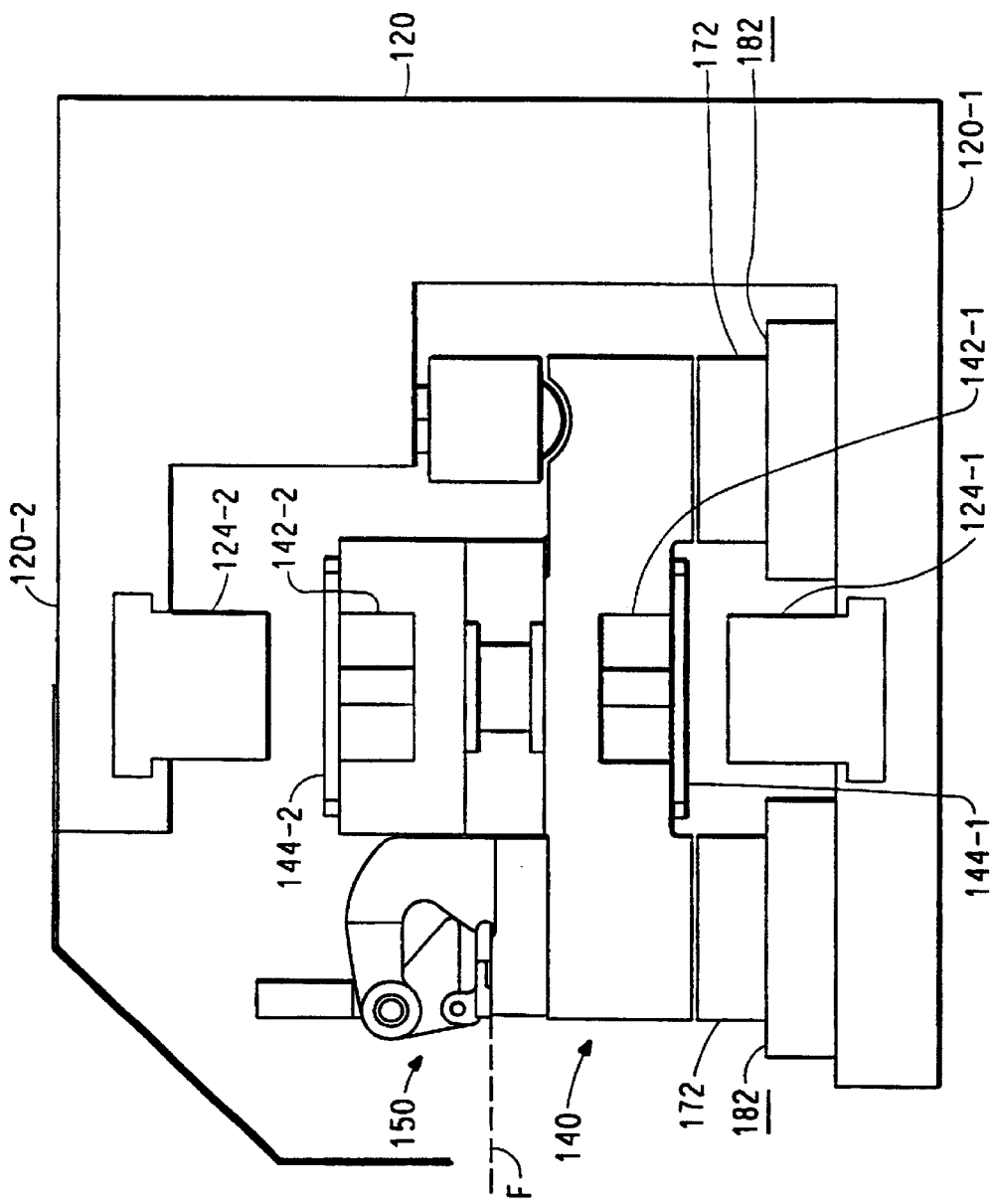
FIG. 15 is an elevational view of a tenter frame apparatus showing a carriage.

FIG. 15 shows an embodiment which generally corresponds to FIG. 4, wherein a track assembly 120 has upper and lower portions 120-2 and 120-1 which support track magnets 124-1 and 124-2, respectively. In this embodiment, the carriage magnet 142 has been divided into two spaced-apart portions 142-1 and 142-2 mounted, respectively, on the lower and upper portions of the carriage 140. Magnet portion 142-1 interacts with track magnet 124-1, and magnet portion 142-2 interacts with track magnet 124-2. A conventional clip assembly 150, employed to grip the film being supported, is also mounted on the carriage 140. In this embodiment, the upper air-bearing of FIG. 4 has been omitted, the weight of the carriage 140 being employed to provide the necessary loading force on the lower air-bearing.

Figure 16:
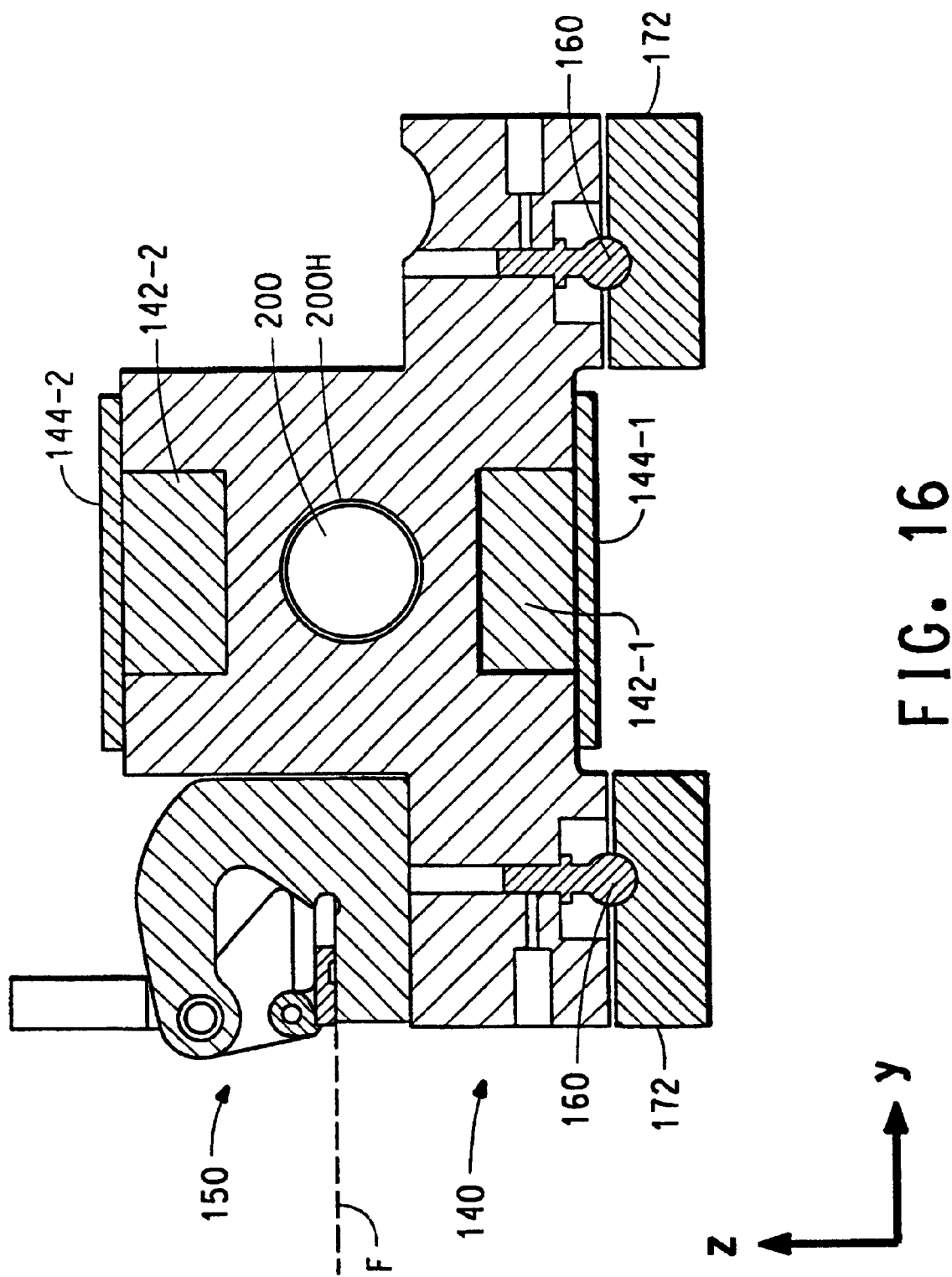
FIG. 16 is a sectional view of the carriage of FIG. 15.

FIG. 16 shows ball carriers 160 which allow floatation pads 172 to conform to any minor irregularities in the shape of a gas-permeable bearing surface 182 (shown in FIG. 15). Metal plates 144-1 and 144-2, known as "back iron", are mounted on the carriage 140 in contact with the magnets 142-1 and 142-2, respectively. A back iron serves to broaden and concentrate the magnetic field of the carriage magnet, as well as to dampen lateral carriage movement as a load is applied. A hole 200 is provided in the carriage 140 through which a drive cable 200 passes. The drive cable 200 is attached to the carriage 140 and is used to propel the carriage 140 along the track assembly 120 by means of a motor.

Figure 17A:
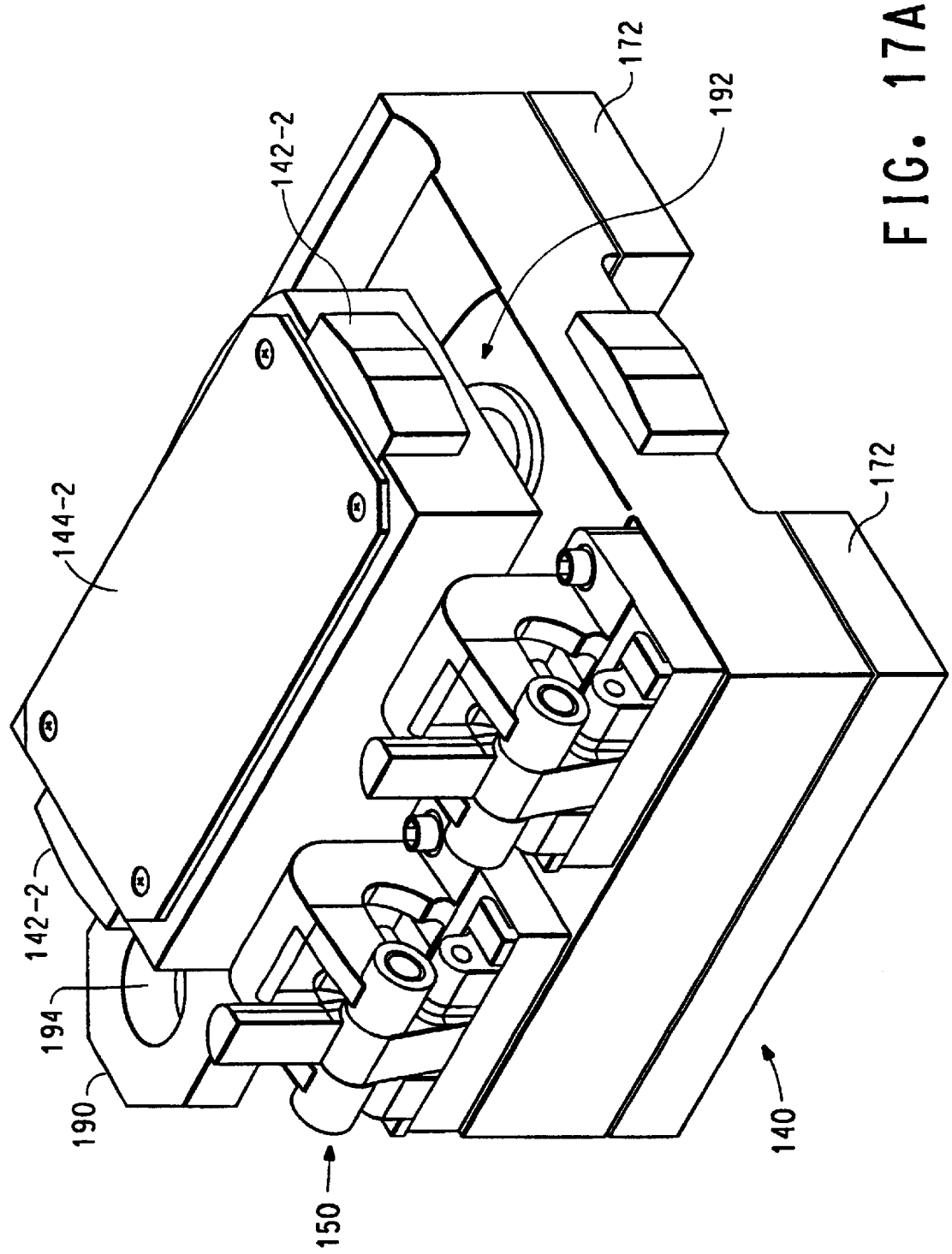
FIGS. 17A and 17B are right and left perspective views of the carriage of FIG. 15.
Figure 17B:
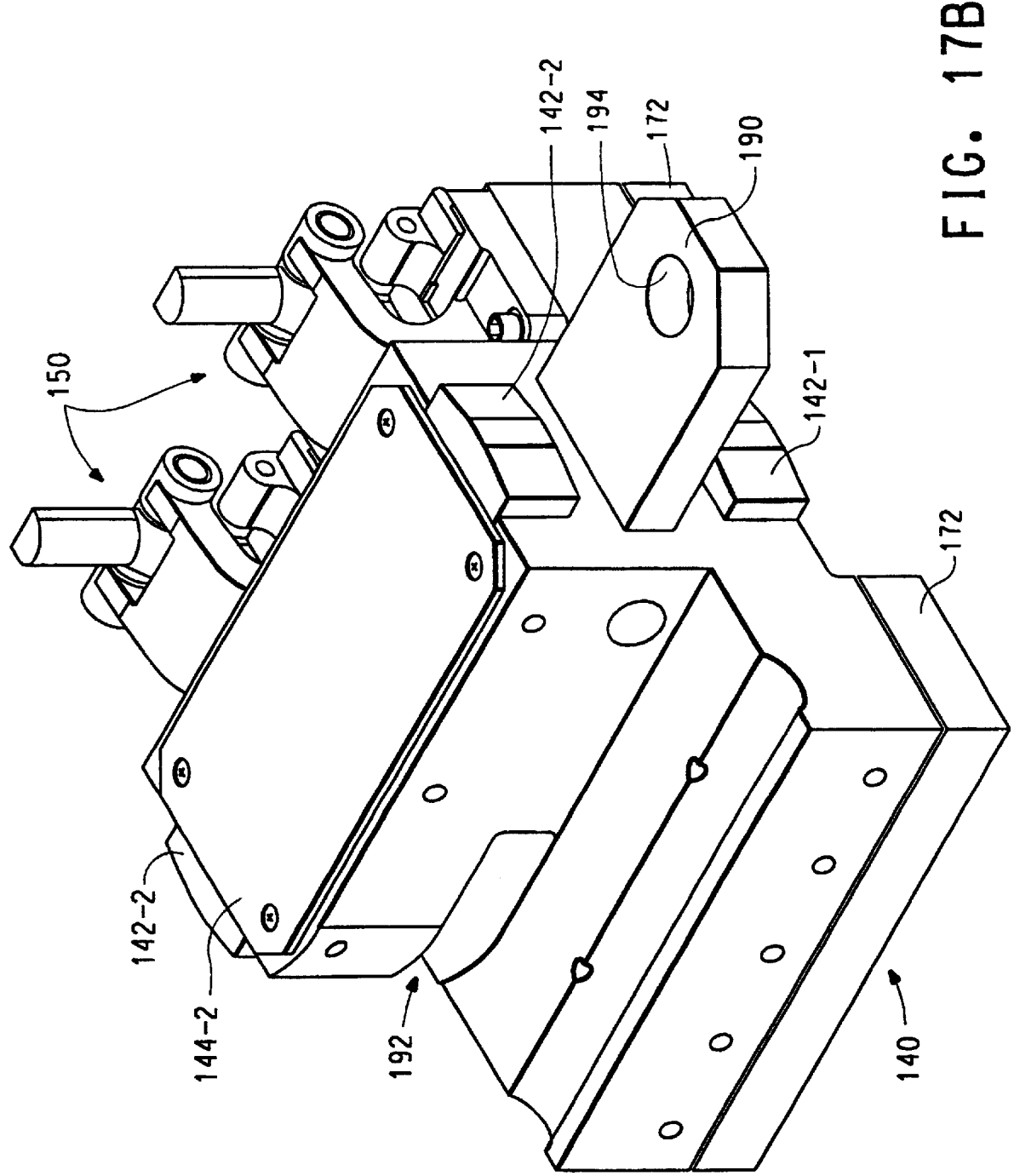

FIGS. 17A and 17B show a coupling means employed to mechanically couple adjacent carriages 140 together. The coupling means comprises a tongue and groove coupler, wherein a tongue 190 of one carriage 140 fits into a corresponding groove 192 of the adjacent carriage 140. The tongue 190 and the groove 192 each contain a precision hole 194 to receive a bearing pin (not shown) which joins the adjacent carriages 140. In use, a plurality of carriages 140 are coupled together to form an endless chain loop, which is driven by conventional motor driven sprockets. The carriages 140 are arranged so that the gap between each magnet 142-1 and 142-2 of a first carriage and the respective magnet 142-1 and 142-2 of the adjacent carriage is minimized. Ideally, this gap should approach zero, so that magnetic drag induced by local variations in magnetic field strength between carriage magnets is minimized. In a film tenter frame, the chain formed by the carriages 140 must pass around the drive sprockets, which requires that there be a small gap between adjacent carriage magnets to prevent damage from rubbing contact.

When the present invention is utilized in a high temperature environment, such as a polymer process, materials for the permanent magnets must be selected to withstand the ambient temperatures. Samarium cobalt magnet material has been found suitable for high-speed film stretching.

What is claimed is:

1. An apparatus (10) for supporting and stretching a film web in a tenter fame, the apparatus (10), arranged in reference to a Cartesian coordinate system, for transporting a carriage (40) along a track (20) in a non-contacting, substantially magnetically drag-free manner, comprising:

a track (20) having an axis (20A) oriented along a first x-axis direction, and having one or more magnets (24) mounted on the track (20), each track magnet (24) being displaced from the first x-axis direction in a second z-axis direction and having its magnetization vector (24M) oriented in the yz-plane at a predetermined angular direction relative to the z-axis;

a carriage (40), guided by the track (20), and having one or more magnets (42) mounted on the carriage (40), each carriage magnet (42) having its magnetization vector (42M) oriented in the yz-plane at a predetermined angular direction relative to the second z-axis direction to interact with the one or more track magnets (24), said interaction being magnetically stable in a third y-axis direction and magnetically unstable in the second z-axis direction, the carriage (40) having mounted thereon a clip assembly (150) adapted to grip the film being supported and apply a film-stretching load along the third y-axis direction; and a passive stabilization means (70) for stabilizing the position of the carriage (40) in the magnetically unstable second z-axis direction by substantially constraining carriage motion to the xy-plane without inducing mechanical friction or magnetic drag on the carriage (40), so that the carriage (40) may be transported in a stable path along the track (20) without mechanical contact while supporting the applied film-stretching load along the third y-axis direction, the path of the carriage (40) being displaced from the first x-axis direction in the third y-axis direction at a distance corresponding to the magnitude of the applied load.

2. The apparatus (10) of claim 1 wherein the magnetization vector (42M) of the carriage magnet (42) is 270 degrees clockwise from the second z-axis direction (i.e., in the negative third y-axis direction), and wherein the magnetization vector (24M) of the track magnet (24) is in the range of zero to 180 degrees from the z-axis (i.e., plus or minus ninety (90) degrees from the third y-axis direction).

3. The apparatus (10) of claim 1 wherein the magnetization vector (42M) of the carriage magnet (42) is in the third y-axis direction, and wherein the magnetization vector (24M) of the track magnet (24) is in the range of 70 to 110 degrees clockwise from the z-axis (i.e., plus or minus 20 degrees from the third y-axis direction).

4. The apparatus (10) of claim 1 wherein the magnetization vector (42M) of the carriage magnet (42) is rotated in a predetermined direction from the second z-axis direction by a predetermined angle, and wherein the magnetization vector (24M) of the track magnet (24) is rotated in the opposite direction from the second z-axis direction by the predetermined angle.

5. An apparatus (10) for supporting and stretching a film web in a tenter frame, the apparatus (10), arranged in a Cartesian coordinate system, for transporting a carriage (40) along a track (20) in a non-contacting, substantially magnetically drag-free manner, comprising:

a track (20) having an axis (20A) oriented along a first x-axis direction, and having one or more magnets (24) mounted on the track (20), each track magnet (24) being displaced from the first x-axis directly in a second z-axis direction and having its magnetization vector (24M) oriented in the yz-plane at a predetermined angular direction relative to the y-axis;

a carriage (40), guided by the track (20), and having one or more magnets (42) mounted on the carriage (40), each carriage magnet (42) having its magnetization vector (42M) oriented in the yz-plane at a predetermined angular direction relative to the second z-axis direction to interact with the one or more track magnets (24), said interaction being magnetically stable in the second z-axis direction and magnetically unstable in a third y-axis direction, the carriage (40) having mounted thereon a clip assembly (150) adapted to grip the film being supported and apply a film-stretching load along the second z-axis direction; and a passive stabilization means (70) for stabilizing the position of the carriage (40) in the magnetically unstable third y-axis direction by substantially constraining carriage motion to the xz-plane without inducing mechanical friction or magnetic drag on the carriage (40), so that the carriage (40) may be transported in a stable path along the track (20) without mechanical contact while supporting the applied film-stretching load along the second z-axis direction, the path of the carriage (40) being displaced from the first x-axis direction in the second z-axis direction at a distance corresponding to the magnitude of the applied load.

6. The apparatus (10) of claim 5 wherein the magnetization vector (42M) of the carriage magnet (42) is in the third y-axis direction, and wherein the magnetization vector (24M) of the track magnet (24) is in the range of plus or minus ninety (90) degrees from the third y-axis direction.

7. The apparatus (10) of claim 5 wherein the magnetization vector (42M) of the carriage magnet (42) is in the third y-axis direction, and wherein the magnetization vector (24M) of the track magnet (24) is in the range of plus or minus 20 degrees from the third y-axis direction.

8. An apparatus (10) for supporting and stretching a film web in a tenter frame, the apparatus arranged for transporting a carriage (40) along a track (20) in a non-contacting, substantially magnetically drag-free manner, comprising:
- a track (20) having an axis (20A) oriented along a first direction, and having one or more magnets (24) mounted on the track (20), each track magnet (24) having its magnetization vector (24M) oriented in a predetermined direction;
- a carriage (40), guided by the track (20), and having one or more magnets (42) mounted on the carriage (40), each carriage magnet (42) having its magnetization vector (42M) oriented in a predetermined direction to interact with the one or more track magnets (24), said interaction being magnetically stable in a second direction that is orthogonal to the first direction and magnetically unstable in a third direction that is orthogonal to both the magnetically stable second direction and the first direction, the carriage (40) having mounted thereon a clip assembly (150) adapted to grip the film being supported and apply a film-stretching load; and
- a passive stabilization means (70) for stabilizing the position of the carriage (40) in the magnetically unstable third direction by substantially constraining carriage motion to a plane orthogonal to the magnetically unstable third direction without inducing mechanical friction or magnetic drag on the carriage (40), so that the carriage (40) may be transported in a stable path along the track (20) without mechanical contact while supporting the applied film-stretching load, the path of the carriage (40) being displaced from the first direction in a direction and at a distance corresponding to the direction and magnitude of the applied load.

9. The apparatus (10) of claim 8 wherein the track (20) has a plane of symmetry.

10. An apparatus (10) for supporting and stretching a film web in a tenter frame, the apparatus arranged for transporting a carriage (40) along a track (20) in a non-contacting, substantially magnetically drag-free manner, comprising:
- a track (20) having a first track element (22) oriented along a first axis and a second track element (22) oriented along a second axis, the first and second track elements (22) being disposed about a common axis (20A) in a physically juxtaposed manner at a predetermined separation distance, said common axis (20A) being oriented along a first direction, wherein one or more magnets (24) are mounted on each track element, each track magnet (24) having its magnetization vector (24M) oriented in a predetermined direction;
- a carriage (40), guided by the track (20), and having one or more magnets (42) mounted on the carriage (40), each carriage magnet (42) having its magnetization vector (42M) oriented in a predetermined direction to interact with the one or more track magnets (24), said interaction being magnetically stable in a second direction that is orthogonal to the first direction and magnetically unstable in a third direction that is orthogonal to both the magnetically stable second direction and the first direction, the carriage (40) having mounted thereon a clip assembly (150) adapted to grip the film being supported and apply a film-stretching load; and
- a passive stabilization (70) means for stabilizing the position of the carriage (40) in the magnetically unstable third direction by substantially constraining carriage motion to a plane orthogonal to the magnetically unstable third direction without inducing mechanical friction or magnetic drag on the carriage (40), so that the carriage (40) may be transported in a stable path along the track (20) without mechanical contact while supporting the applied film-stretching load, the path of the carriage (40) being displaced from the common axis (20A) in a direction and at a distance corresponding to the direction and magnitude of the applied load.

11. The apparatus (10) of claim 10 wherein the track elements (22) are symmetrically arranged about the common axis (20A), thereby defining a plane of symmetry.

12. The apparatus (10) of claim 11 wherein the one or more carriage magnets (42) are mounted along and parallel to the common axis (20A), and the magnetization vectors (42M) of the carriage magnets (42) are oriented in a predetermined direction, so that the direction of magnetic stability is in the plane of symmetry.

13. The apparatus (10) of claim 12 wherein the magnetization vectors (24M) of the track magnets (24) are rotated by a predetermined angle in a first rotational direction about the axis of the track element (22), and the magnetization vector (42M) of each carriage magnet (42) is rotated by the predetermined angle in an opposite rotational direction about the axis of the carriage (40), so that the direction of magnetic stability is preserved.

14. The apparatus (10) of claim 11 wherein the one or more carriage magnets (42) are mounted along and parallel to the common axis (20A), and the magnetization vectors (42M) of the carriage magnets (42) are oriented in a predetermined direction, so that the direction of magnetic stability is perpendicular to the plane of symmetry.

15. The apparatus (10) of claim 14 wherein the magnetization vectors (24M) of the track magnets (24) are rotated by a predetermined angle in a first rotational direction about the axis of the track element (22), and the magnetization vector (42M) of each carriage magnet (42) is rotated by the predetermined angle in an opposite rotational direction about the axis of the carriage (40), so that the direction of magnetic stability is preserved.

16. The apparatus (10) of claim 14 wherein pairs of carriage permanent magnets (42-1, 42-2) are mounted in the plane of symmetry, each carriage magnet being symmetrically offset from the common axis (20A), and the magnetization vectors (42M-1, 42M-2) of the carriage magnets (42-1, 42-2) are oriented in the magnetically stable second direction; and
wherein the track magnets (24) are symmetrically disposed about the plane of symmetry and the magnetization vectors (24M) of the track magnets (24) are symmetrically disposed at a first angle from the plane of symmetry, a first track magnet (24) being mounted on the first track element (22) and being disposed to one side of the plane of symmetry adjacent the pair of carriage magnets (42-1, 42-2), and a second track magnet (24) being mounted on the second track element (22) and being disposed to the other side of the plane of symmetry adjacent the pair of carriage magnets (42-1, 42-2), so that a load exerted upon the carriage (40) orthogonal to the plane of symmetry is shared by the interaction of the pairs of carriage magnets (42-1, 42-2) with the magnets (24) of the first track element (22) and the interaction of the pairs of carriage magnets (42-1, 42-2) with the magnets (24) of the second track element (22).

17. The apparatus (10) of claim 16 wherein the load is shared substantially equally.

18. The apparatus (10) of claim 16 wherein the load is shared unequally so that a preload is exerted upon the stabilization means.

19. The apparatus (10) of claim 10 wherein the passive stabilization means (70) comprises a gas bearing means.

20. The apparatus (10) of claim 19 wherein the gas bearing means comprises:
  one or more generally planar bearing platens (82) on one or both track elements (22), said bearing platens (82) being oriented generally perpendicular to the magnetically unstable third direction, the bearing platens (82) having a bearing surface (86) permeable to the gas (either porous or having a plurality of orifices thereon), a gas distribution means (manifold or permeable substrate 84) therein, and a pressurized gas supply means (90) connected to the gas distribution means (84); and
  one or more generally planar flotation pads (72) mounted on the carriage (40), the plane of each pad (72) being oriented in a direction parallel to the orientation of the corresponding bearing platen (82), so that each floatation pad (72) on the carriage (40) is supported by the corresponding bearing platen (82) in a non-contacting, substantially friction-free manner.

21. The apparatus (10) of claim 20 comprising first and second planar bearing platens (82), the first bearing platen (82) being disposed below a first planar flotation pad (72) mounted on the carriage (40) to define a first aerostatic bearing to support the weight of the carriage (40), and the second bearing platen (82) being disposed above a second planar flotation pad (72) mounted on the carriage (40) to define a second aerostatic bearing that preloads the first aerostatic bearing and provides a predetermined stiffness factor to the position of the carriage (40) in the magnetically unstable third direction.

22. The apparatus (10) of claim 10 wherein the passive stabilization means (70) comprises a magnetic eddy current stabilization means (70') for stabilizing the position of the carriage (40) in the magnetically unstable third direction when the carriage (40) is either stationary or in motion, while inducing substantially no magnetic drag upon the carriage (40).

23. The apparatus (10) of claim 22 wherein the magnetic eddy current stabilization means (70') comprises:
  an electrically conductive plate (46) mounted on the carriage (40); and
  a plurality of parallel conductors (26) mounted in the track (20), the conductors (26) adapted to be energized by a multi-phase current source having one or more phases, each conductor (26) carrying an alternating current from each respective sequential phase of the multi-phase source, such that the conductive plate (46) on the carriage (40) interacts with the plurality of conductors (26) to create eddy currents in the plate (46) such that a stabilizing force is created on the carriage (40) in the magnetically unstable third direction.

24. The apparatus (10) of claim 23 wherein the parallel conductors (26) comprise elongated coils (28) and net current in the parallel conductors (26) is zero.

25. The apparatus (10) of claim 23 wherein a plurality of three conductors (26) is energized by a current source having three phases.

26. The apparatus (10) of claim 22 wherein the magnetic eddy current stabilization means (70') comprises:
  an electrically conductive plate (46) mounted on the track (20); and
  an elongated coil (28) in the carriage (40), the coil (28) being energized by an alternating current source and the coil (28) being oriented to create eddy currents in the plate (46) such that a stabilizing force is created on the carriage (40) in the magnetically unstable third direction.

27. The apparatus (10) of claim 26 wherein the magnetic eddy current stabilization means (70') comprises an alternating current source for supplying current at a frequency range in which substantially no magnetic drag is induced on the carriage (40), said frequency range having as a lower limit a first critical frequency above which no magnetic drag is induced on the carriage (40) when the carriage (40) is in motion.

28. The apparatus (10) of claim 27 wherein the frequency range of the alternating current source further comprises a second critical frequency, as an upper limit, below which no magnetic drag is induced on the carriage.

29. The apparatus (10) of claim 10 wherein the one or more carriage magnets (142-1, 142-2) are mounted along the common axis (20A), and the magnetization vectors (142M-1, 142M-2) of the carriage magnets (142-1, 142-2) are oriented in the magnetically unstable third direction, the track magnets (142-1, 142-2) being symmetrically disposed about the plane of symmetry;
  a first track magnet (124-1) is mounted on the first track element (120-1) and disposed to one side of the plane of symmetry adjacent the one or more carriage magnets (142-1, 142-2); and
  a second track magnet (124-2) is mounted on the second track element (120-2) and disposed to the other side of the plane of symmetry adjacent the one or more carriage magnets (142-1, 142-2), so that a load exerted upon the carriage (140) along the plane of symmetry is shared by the interaction of the carriage magnets (142-1, 142-2) with the magnets (124-1) of the first track element (120-1) and the magnets (124-2) of the second track element (120-2).

30. The apparatus (10) of claim 29 wherein the load is shared substantially equally.

31. The apparatus (10) of claim 29 wherein the load is shared unequally so that a preload is exerted upon the stabilization means (70).

32. The apparatus (10) of claim 10 wherein the one or more carriage magnets (42) are mounted along the common axis (20A), and the magnetization vectors (42M) of the carriage magnets (42) are oriented in the magnetically stable second direction, the track magnets (24) being symmetrically disposed about plane of symmetry;
  a first track magnet (24) is mounted on the first track element (22) and disposed to one side of the plane of symmetry adjacent the one or more carriage magnets (42); and
  a second track magnet (24) is mounted on the second track element (22) and disposed to the other side of the plane of symmetry adjacent the carriage magnet (42), so that a load exerted upon the carriage (40) orthogonal to the plane of symmetry is shared by the interaction of the carriage magnets (42) with the magnets (24) of the first track element (22) and the magnets (24) of the second track element (22).

33. The apparatus (10) of claim 32 wherein the load is shared substantially equally.

34. The apparatus (10) of claim 32 wherein the load is shared unequally so that a preload is exerted upon the stabilization means (70).

35. The apparatus (10) of claim 10 comprising a plurality of carriages (140), the carriages (140) being guided by the track (120) and being linked together and spaced apart at a predetermined distance.

* * * * *